US011516821B2

(12) United States Patent
Zhou et al.

(10) Patent No.: US 11,516,821 B2
(45) Date of Patent: Nov. 29, 2022

(54) SIMULTANEOUS SEMI-PERSISTENT SCHEDULING (SPS) OR CONFIGURED GRANT (CG) PARAMETER UPDATE FOR MULTIPLE DEVICES

(71) Applicant: QUALCOMM Incorporated, San Diego, CA (US)

(72) Inventors: Yan Zhou, San Diego, CA (US); Tao Luo, San Diego, CA (US); Mostafa Khoshnevisan, San Diego, CA (US); Seyed Ali Akbar Fakoorian, San Diego, CA (US); Konstantinos Dimou, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 16/903,623

(22) Filed: Jun. 17, 2020

(65) Prior Publication Data
US 2020/0404682 A1 Dec. 24, 2020

Related U.S. Application Data

(60) Provisional application No. 62/865,050, filed on Jun. 21, 2019.

(51) Int. Cl.
*H04W 72/12* (2009.01)
*H04W 72/14* (2009.01)

(52) U.S. Cl.
CPC ... *H04W 72/1205* (2013.01); *H04W 72/1273* (2013.01); *H04W 72/14* (2013.01)

(58) Field of Classification Search
None
See application file for complete search history.

(56) References Cited

U.S. PATENT DOCUMENTS

2014/0362832 A1* 12/2014 Rudolf ............... H04L 1/1822
370/336
2016/0100422 A1* 4/2016 Papasakellariou .... H04L 1/1861
370/329
(Continued)

FOREIGN PATENT DOCUMENTS

EP 3437407 A1 2/2019
WO 2013017178 A1 2/2013
(Continued)

OTHER PUBLICATIONS

Ericsson: "Enhancement of Uplink Grant-Free Transmission for NR URLLC", 3GPP TSG-RAN1 Meeting #94, R1-1808149, Mobile Competence Centre, 650, Route Des Lucioles, F-06921 Sophia-Antipol, Gothenburg, Sweden, Aug. 20, 2018-Aug. 24, 2018, XP051515551, 7 Pages, Retrieved from the Internet: URL: http://www.3gpp.org/ftp/tsg%5Fran/WG1%5FRL1/TSGR1%5F94/Docs/R1%2D1808149%2Ezip [retrieved on Aug. 11, 2018] p. 1-p. 7.
(Continued)

*Primary Examiner* — Kodzovi Acolatse
(74) *Attorney, Agent, or Firm* — Qualcomm Incorporated

(57) ABSTRACT

Apparatus and methods for wireless communication at a user equipment (UE) are provided. In an aspect, the UE receives a downlink communication from a base station, the downlink communication including an update to at least one semi-persistent scheduling (SPS) or configured grant (CG) parameter. The downlink communication also indicates whether to use a first action time or a second action time for the update to take effect. The UE determines the action time for the at least one SPS or CG parameter update to take effect based on the downlink communication. The UE then applies the update to the at least one SPS or CG parameter for communications of the UE beginning at and following the action time.

32 Claims, 9 Drawing Sheets

(56) References Cited

U.S. PATENT DOCUMENTS

| | | | |
|---|---|---|---|
| 2018/0139734 A1* | 5/2018 | Babaei | H04W 72/0406 |
| 2018/0288746 A1 | 10/2018 | Zhang et al. | |
| 2018/0368174 A1 | 12/2018 | Jeon et al. | |
| 2019/0069319 A1 | 2/2019 | Arshad et al. | |
| 2019/0159065 A1 | 5/2019 | Kim et al. | |
| 2019/0215781 A1* | 7/2019 | Jeon | H04W 24/10 |
| 2020/0235861 A1* | 7/2020 | Belleschi | H04W 72/042 |
| 2021/0007088 A1 | 1/2021 | Zhou | |
| 2021/0045184 A1* | 2/2021 | Sato | H04W 76/38 |
| 2021/0167930 A1* | 6/2021 | Jeon | H04W 76/28 |
| 2021/0266932 A1* | 8/2021 | Liu | H04W 72/14 |

FOREIGN PATENT DOCUMENTS

| | | |
|---|---|---|
| WO | 2018019085 A1 | 2/2018 |
| WO | 2020030693 A1 | 2/2020 |

OTHER PUBLICATIONS

Ericsson: "Handling of SPS and CS Reconfiguration", 3GPP TSG-RAN WG2 AH 1807, R2-1810183, Mobile Competence Centre, 650, Route Des Lucioles, F-06921 Sophia-Antipolis Cedex, France, Montreal, Canada, Jul. 2, 2018-Jul. 6, 2018, XP051467383, pp. 1-4, Retrieved from the Internet: URL: http://www.3gpp.org/ftp/Meetings%5F3GPP%5FSYNC/RAN2/Docs [retrieved on Jul. 1, 2018] Paragraph [02.3].

Interdigital Inc: "On PDCCH Enhancements for eURLLC", 3GPP TSG RAN WG1 #97; R1-1907110, Mobile Competence Centre ; 650, Route Des Lucioles ; F-06921 Sophia-Antipolis Cedex; France, Reno, USA; Apr. 13, 2019-Apr. 17, 2019, XP051728556,4 Pages Retrieved from the Internet: URL:http://www.3gpp.org/ftp/Meetings%5F3GPP%5FSYNC/RAN1/Docs/R1%2D1907110%2Ezip [retrieved on May 13, 2019] p. 1-p. 3.

International Search Report and Written Opinion—PCT/US2020/038378—ISA/EPO—dated Jan. 11, 2021.

Partial International Search Report—PCT/US2020/038378—ISA/EPO—dated Oct. 14, 2020.

Qualcomm Incorporated: "PDCCH-based PowerSaving Channel Design," 3GPP TSG-RAN WG1 #97, R1-1907294, Mobile Competence Centre, 650, Route Des Lucioles, F-06921, Sophia-Antipolis Cedex, France, Reno, USA, May 13, 2019-May 17, 2019, XP051728734, 16 pages, Retrieved from the Internet: URL: http://www.3gpp.org/ftp/Meetings%5F3GPP%5FSYNC/RAN1/Docs/R1%2D1907294%2Ezip [retrieved on May 13, 2019] paragraph [2.2.3.1]—paragraph [2 2.3.3], p. 1-p. 15.

* cited by examiner

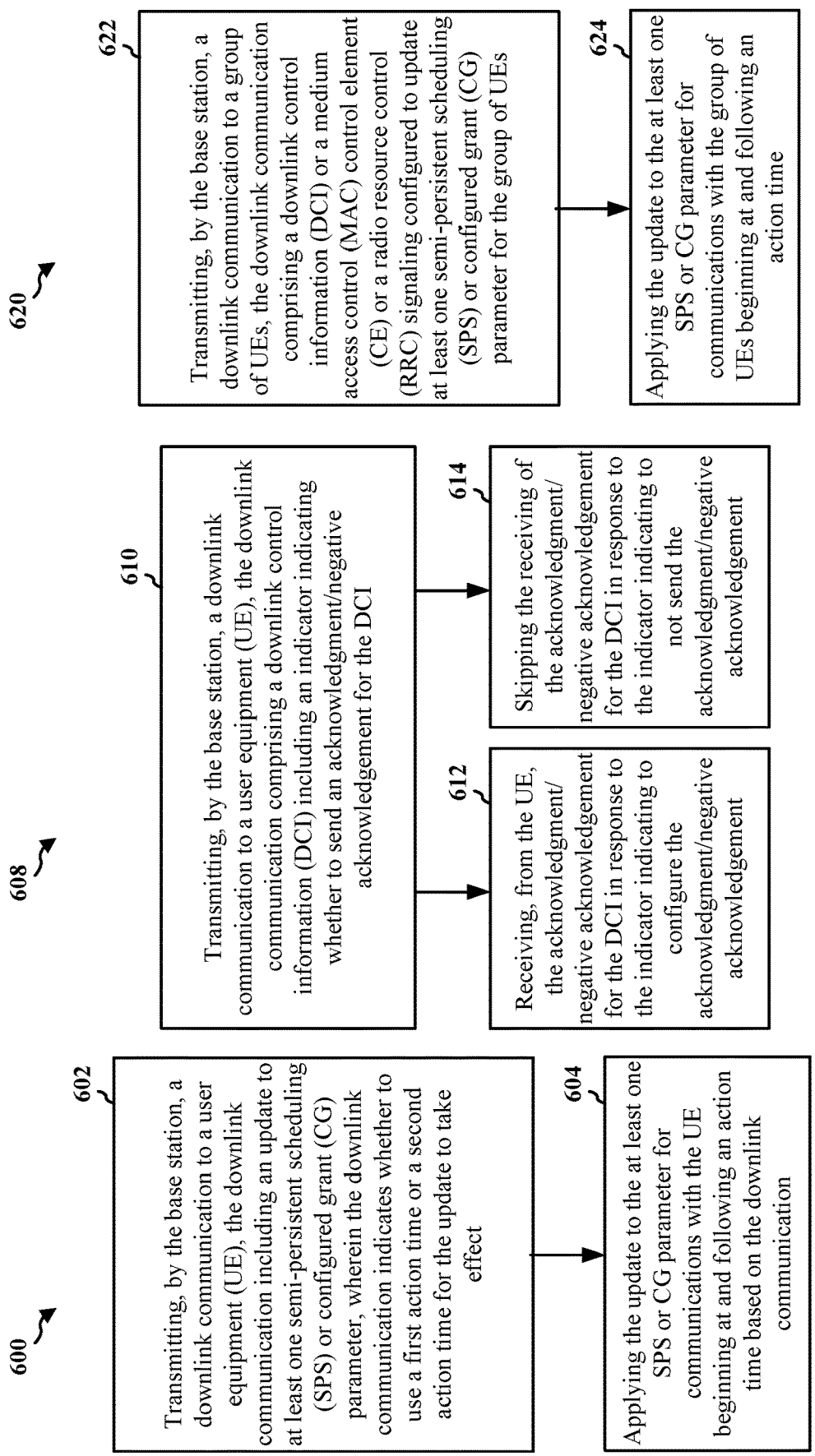

SIMULTANEOUS SEMI-PERSISTENT SCHEDULING (SPS) OR CONFIGURED GRANT (CG) PARAMETER UPDATE FOR MULTIPLE DEVICES

CROSS REFERENCE TO RELATED APPLICATION(S)

This application claims the benefit of U.S. Provisional Application Ser. No. 62/865,050, entitled "SIMULTANEOUS SEMI-PERSISTENT SCHEDULING (SPS) OR CONFIGURED GRANT (CG) PARAMETER UPDATE FOR MULTIPLE DEVICES" and filed on Jun. 21, 2019, which is expressly incorporated by reference herein in its entirety.

BACKGROUND

The present disclosure relates generally to communication systems, and more particularly, to techniques regarding semi-persistent scheduling (SPS), configured grant (GC), or the like or some combination thereof.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In some cases, a configured grant (CG) may refer to a mode where some resources in an uplink are pre-configured for a user equipment (UE). As such, the UE may use the CG for autonomous uplink data transmission when the UE has data, without the UE having to transmit a scheduling request and receive an explicit uplink grant on a physical downlink control channel (PDCCH) for the specific resource. In some cases, semi-persistent scheduling (SPS) may provide for the scheduling of a periodic uplink or downlink communication for a UE. For example, a base station, such as a gNodeB (gNB), may configure and activate downlink SPS to schedule a UE to receive a periodic physical downlink shared channel (PDSCH) without a PDCCH for every transmission. Similarly, the gNB may configure and activate uplink SPS to schedule a UE to transmit on a periodic physical uplink shared channel (PUSCH) without a physical uplink control channel (PUCCH) for every transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In aspects of the disclosure, methods, a computer-readable mediums, and apparatuses are provided.

In an aspect, a method of wireless communication for a user equipment (UE) includes receiving, by the UE, a downlink communication from a base station, the downlink communication including an update to at least one semi-persistent scheduling (SPS) or configured grant (CG) parameter, where the downlink communication indicates whether to use a first action time or a second action time for the update to take effect. The method further includes determining an action time for the update to take effect based on the downlink communication. The method further includes applying the update to the at least one SPS or CG parameter for communications of the UE beginning at and following the action time.

In a further aspect, a method of wireless communication for a UE includes receiving, by the UE, a downlink communication from a base station, the downlink communication including a downlink control information (DCI) or a medium access control (MAC) control element (CE) or a radio resource control (RRC) signaling configured to update at least one SPS or CG parameter for a group of UEs including the UE. The method further includes determining an action time for the update to take effect based on the downlink communication. The method further includes applying the update to the at least one SPS or CG parameter for communications of the UE beginning at and following the action time.

In another aspect, a method of wireless communication by a UE includes receiving, by the UE, a downlink communication from a base station, the downlink communication including a DCI, the DCI including an indicator indicating whether to send an acknowledgment/negative acknowledgement for the DCI. The method further includes sending the acknowledgment/negative acknowledgement for the DCI in response to the indicator indicating to send the acknowledgment/negative acknowledgement. The method further includes skipping generation of and the sending of the acknowledgment/negative acknowledgement for the DCI in response to the indicator indicating to not send the acknowledgment/negative acknowledgement.

In yet another aspect, a UE includes a transceiver; a memory configured to store instructions; and one or more processors communicatively coupled with the transceiver and the memory. The one or more processors are configured to execute the instructions to perform wireless communication including receiving, by the UE, a downlink communication from a base station, the downlink communication including an update to at least one SPS or CG parameter, where the downlink communication indicates whether to use a first action time or a second action time for the update to take effect; determining an action time for the update to take effect based on the downlink communication; and applying the update to the at least one SPS or CG parameter for communications of the UE beginning at and following the action time.

In a further aspect, a UE includes a transceiver; a memory configured to store instructions; and one or more processors communicatively coupled with the transceiver and the memory. The one or more processors are configured to execute the instructions to perform wireless communication including receiving, by the UE, a downlink communication from a base station, the downlink communication including a DCI or a MAC CE or an RRC signaling configured to update at least one SPS or CG parameter for a group of UEs including the UE; determining an action time for the update to take effect based on the downlink communication; and applying the update to the at least one SPS or CG parameter for communications of the UE beginning at and following the action time.

In another aspect, a UE includes a transceiver; a memory configured to store instructions; and one or more processors communicatively coupled with the transceiver and the memory. The one or more processors are configured to execute the instructions to perform wireless communication including receiving, by the UE, a downlink communication from a base station, the downlink communication including a DCI, the DCI including an indicator indicating whether to send an acknowledgment/negative acknowledgement for the DCI; sending the acknowledgment/negative acknowledgement for the DCI in response to the indicator indicating to send the acknowledgment/negative acknowledgement; and skipping generation of and the sending of the acknowledgment/negative acknowledgement for the DCI in response to the indicator indicating to not send the acknowledgment/negative acknowledgement.

In a further aspect, an apparatus for wireless communication includes means for receiving, by a UE, a downlink communication from a base station, the downlink communication including an update to at least one SPS or CG parameter, where the downlink communication indicates whether to use a first action time or a second action time for the update to take effect; means for determining an action time for the update to take effect based on the downlink communication; and means for applying the update to the at least one SPS or CG parameter for communications of the UE beginning at and following the action time.

In a further aspect, an apparatus for wireless communication includes means for receiving, by a UE, a downlink communication from a base station, the downlink communication including a DCI or a MAC CE or an RRC signaling configured to update at least one SPS or CG parameter for a group of UEs including the UE; means for determining an action time for the update to take effect based on the downlink communication; and means for applying the update to the at least one SPS or CG parameter for communications of the UE beginning at and following the action time.

In a further aspect, an apparatus for wireless communication includes means for receiving, by a UE, a downlink communication from a base station, the downlink communication including a DCI, the DCI including an indicator indicating whether to send an acknowledgment/negative acknowledgement for the DCI; means for sending the acknowledgment/negative acknowledgement for the DCI in response to the indicator indicating to send the acknowledgment/negative acknowledgement; and means for skipping generation of and the sending of the acknowledgment/negative acknowledgement for the DCI in response to the indicator indicating to not send the acknowledgment/negative acknowledgement.

In another aspect, a computer-readable medium includes code executable by one or more processors to perform wireless communication including receiving, by a UE, a downlink communication from a base station, the downlink communication including an update to at least one SPS or CG parameter, where the downlink communication indicates whether to use a first action time or a second action time for the update to take effect; determining an action time for the update to take effect based on the downlink communication; and applying the update to the at least one SPS or CG parameter for communications of the UE beginning at and following the action time.

In a further aspect, a computer-readable medium includes code executable by one or more processors to perform wireless communication including receiving, by a UE, a downlink communication from a base station, the downlink communication including a DCI or a MAC CE or an RRC signaling configured to update at least one SPS or CG parameter for a group of UEs including the UE; determining an action time for the update to take effect based on the downlink communication; and applying the update to the at least one SPS or CG parameter for communications of the UE beginning at and following the action time.

In another aspect, a computer-readable medium includes code executable by one or more processors to perform wireless communication including receiving, by a UE, a downlink communication from a base station, the downlink communication including a DCI, the DCI including an indicator indicating whether to send an acknowledgment/negative acknowledgement for the DCI; sending the acknowledgment/negative acknowledgement for the DCI in response to the indicator indicating to send the acknowledgment/negative acknowledgement; and skipping generation of and the sending of the acknowledgment/negative acknowledgement for the DCI in response to the indicator indicating to not send the acknowledgment/negative acknowledgement.

In an aspect, a method of wireless communication for a base station includes transmitting, by the base station, a downlink communication to a UE, the downlink communication including an update to at least one SPS or CG parameter, where the downlink communication indicates whether to use a first action time or a second action time for the update to take effect. The method further includes applying the at least one SPS or CG parameter update for communications with the UE beginning at and following an action time based on the downlink communication.

In a further aspect, a method of wireless communication for a base station includes transmitting, by the base station, a downlink communication to a group of UEs, the downlink communication including a DCI or a MAC CE or an RRC signaling configured to update at least one SPS or CG parameter for the group of UEs. The method further includes applying the update to the at least one SPS or CG parameter for communications of the group of UEs beginning at and following an action time.

In another aspect, a method of wireless communication for a base station includes transmitting, by the base station, a downlink communication to a UE, the downlink communication including a DCI, the DCI including an indicator indicating whether to send an acknowledgment/negative acknowledgement for the DCI. The method further includes receiving, from the UE, the acknowledgment/negative acknowledgement for the DCI in response to the indicator indicating to configure the acknowledgment/negative acknowledgement. The method further includes skipping the receiving of the acknowledgment/negative acknowledgement for the DCI in response to the indicator indicating to not send the acknowledgment/negative acknowledgement.

In yet another aspect, a base station for wireless communication includes a transceiver; a memory configured to store instructions; and one or more processors communicatively coupled with the transceiver and the memory. The one or more processors are configured to execute the instructions to perform wireless communication including transmitting, by the base station, a downlink communication to a UE, the downlink communication including an update to at least one SPS or CG parameter, where the downlink communication indicates whether to use a first action time or a second action time for the update to take effect; and applying the at least one SPS or CG parameter update for communications with the UE beginning at and following an action time based on the downlink communication.

In a further aspect, a base station for wireless communication includes a transceiver; a memory configured to store instructions; and one or more processors communicatively coupled with the transceiver and the memory. The one or more processors are configured to execute the instructions to perform wireless communication including transmitting, by the base station, a downlink communication to a group of UEs, the downlink communication including a DCI or a MAC CE or an RRC signaling configured to update at least one SPS or CG parameter for the group of UEs; and applying the update to the at least one SPS or CG parameter for communications of the group of UEs beginning at and following an action time.

In another aspect, a base station for wireless communication includes a transceiver; a memory configured to store instructions; and one or more processors communicatively coupled with the transceiver and the memory. The one or more processors are configured to execute the instructions to perform wireless communication including transmitting, by the base station, a downlink communication to a UE, the downlink communication including a DCI, the DCI including an indicator indicating whether to send an acknowledgment/negative acknowledgement for the DCI; receiving, from the UE, the acknowledgment/negative acknowledgement for the DCI in response to the indicator indicating to configure the acknowledgment/negative acknowledgement; and skipping the receiving of the acknowledgment/negative acknowledgement for the DCI in response to the indicator indicating to not send the acknowledgment/negative acknowledgement.

In a further aspect, an apparatus for wireless communication includes means for transmitting, by a base station, a downlink communication to a UE, the downlink communication including an update to at least one SPS or CG parameter, where the downlink communication indicates whether to use a first action time or a second action time for the update to take effect; and means for applying the at least one SPS or CG parameter update for communications with the UE beginning at and following an action time based on the downlink communication.

In a further aspect, an apparatus for wireless communication includes means for transmitting, by a base station, a downlink communication to a group of UEs, the downlink communication including a DCI or a MAC CE or an RRC signaling configured to update at least one SPS or CG parameter for the group of UEs; and means for applying the update to the at least one SPS or CG parameter for communications of the group of UEs beginning at and following an action time.

In another aspect, an apparatus for wireless communication includes means for transmitting, by a base station, a downlink communication to a UE, the downlink communication including a DCI, the DCI including an indicator indicating whether to send an acknowledgment/negative acknowledgement for the DCI; means for receiving, from the UE, the acknowledgment/negative acknowledgement for the DCI in response to the indicator indicating to configure the acknowledgment/negative acknowledgement; and means for skipping the receiving of the acknowledgment/negative acknowledgement for the DCI in response to the indicator indicating to not send the acknowledgment/negative acknowledgement.

In another aspect, a computer-readable medium includes code executable by one or more processors to perform wireless communication including transmitting, by a base station, a downlink communication to a UE, the downlink communication including an update to at least one SPS or CG parameter, where the downlink communication indicates whether to use a first action time or a second action time for the update to take effect; and applying the at least one SPS or CG parameter update for communications with the UE beginning at and following an action time based on the downlink communication.

In a further aspect, a computer-readable medium includes code executable by one or more processors to perform wireless communication including transmitting, by a base station, a downlink communication to a group of UEs, the downlink communication including a DCI or a MAC CE or an RRC signaling configured to update at least one SPS or CG parameter for the group of UEs; and applying the update to the at least one SPS or CG parameter for communications of the group of UEs beginning at and following an action time.

In another aspect, a computer-readable medium includes code executable by one or more processors to perform wireless communication including transmitting, by a base station, a downlink communication to a UE, the downlink communication including a DCI, the DCI including an indicator indicating whether to send an acknowledgment/negative acknowledgement for the DCI; receiving, from the UE, the acknowledgment/negative acknowledgement for the DCI in response to the indicator indicating to configure the acknowledgment/negative acknowledgement; and skipping the receiving of the acknowledgment/negative acknowledgement for the DCI in response to the indicator indicating to not send the acknowledgment/negative acknowledgement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

or configured grant (CG) parameters for multiple user equipments (UEs), in accordance with various aspects of the present disclosure.

Figure 2:
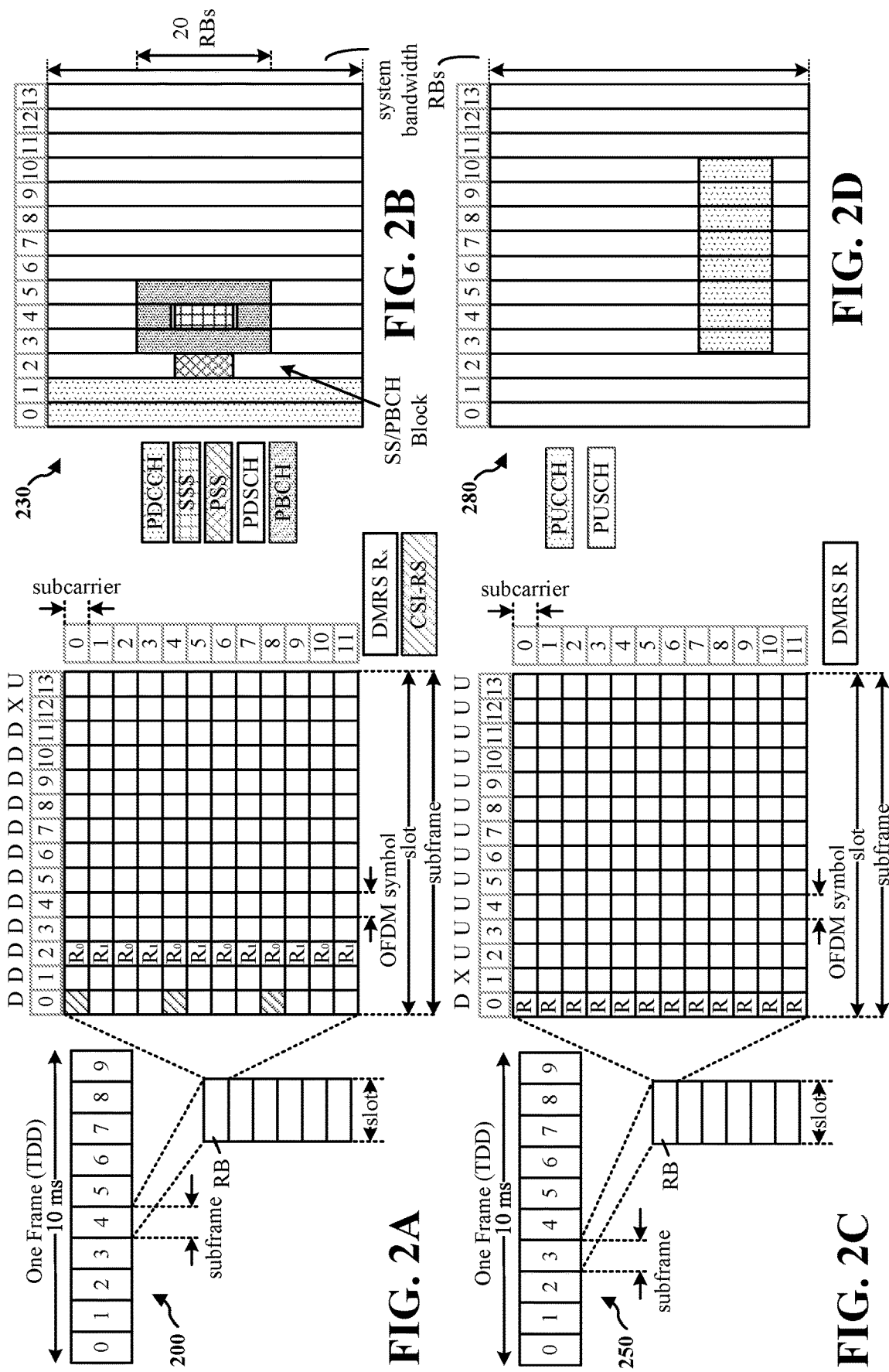

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

Figure 3:
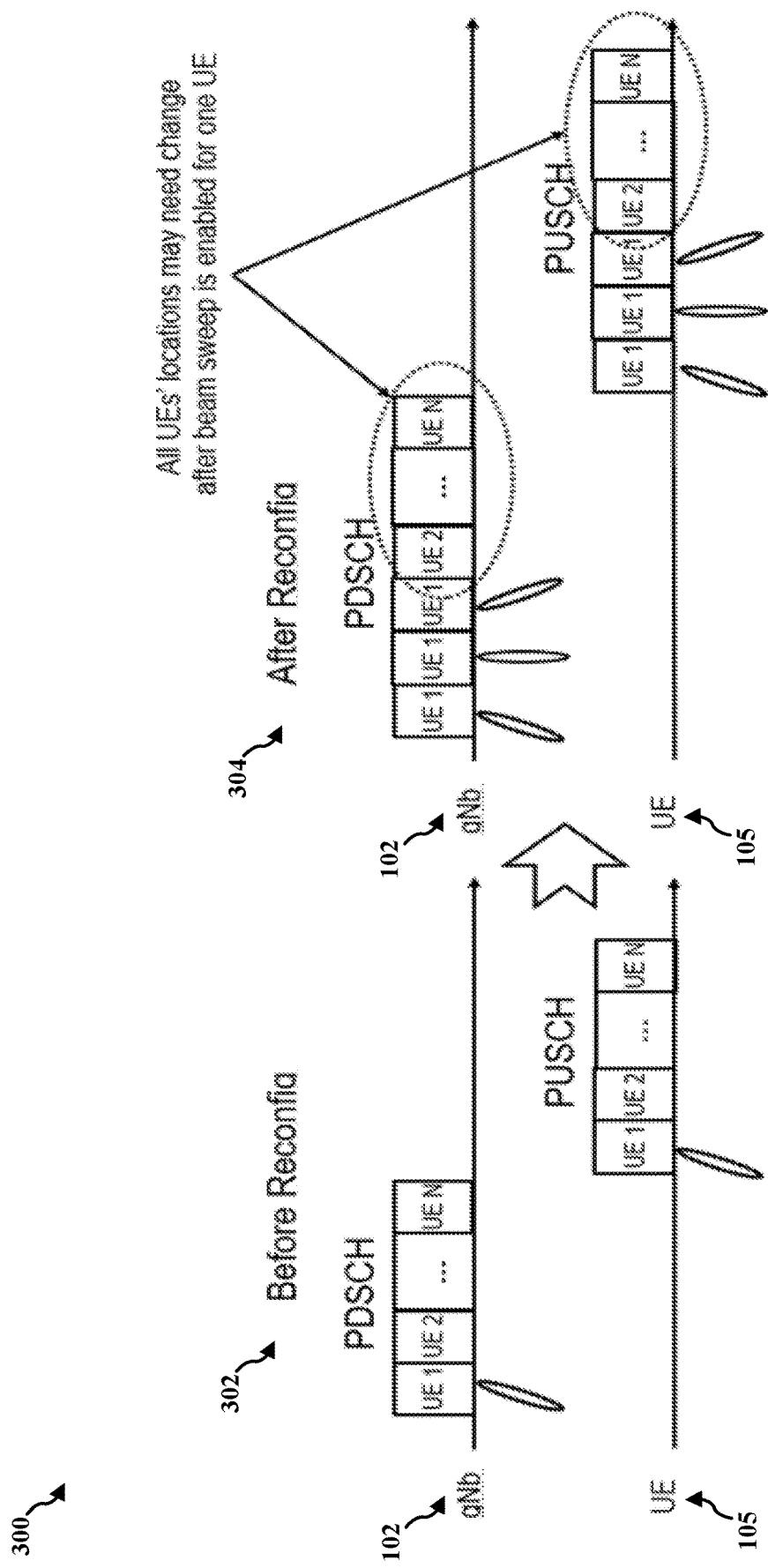

FIG. 3 is a diagram illustrating example downlink and uplink signaling for SPS before and after an SPS/CG parameter reconfiguration, in accordance with certain aspects of the present disclosure.

Figure 4:
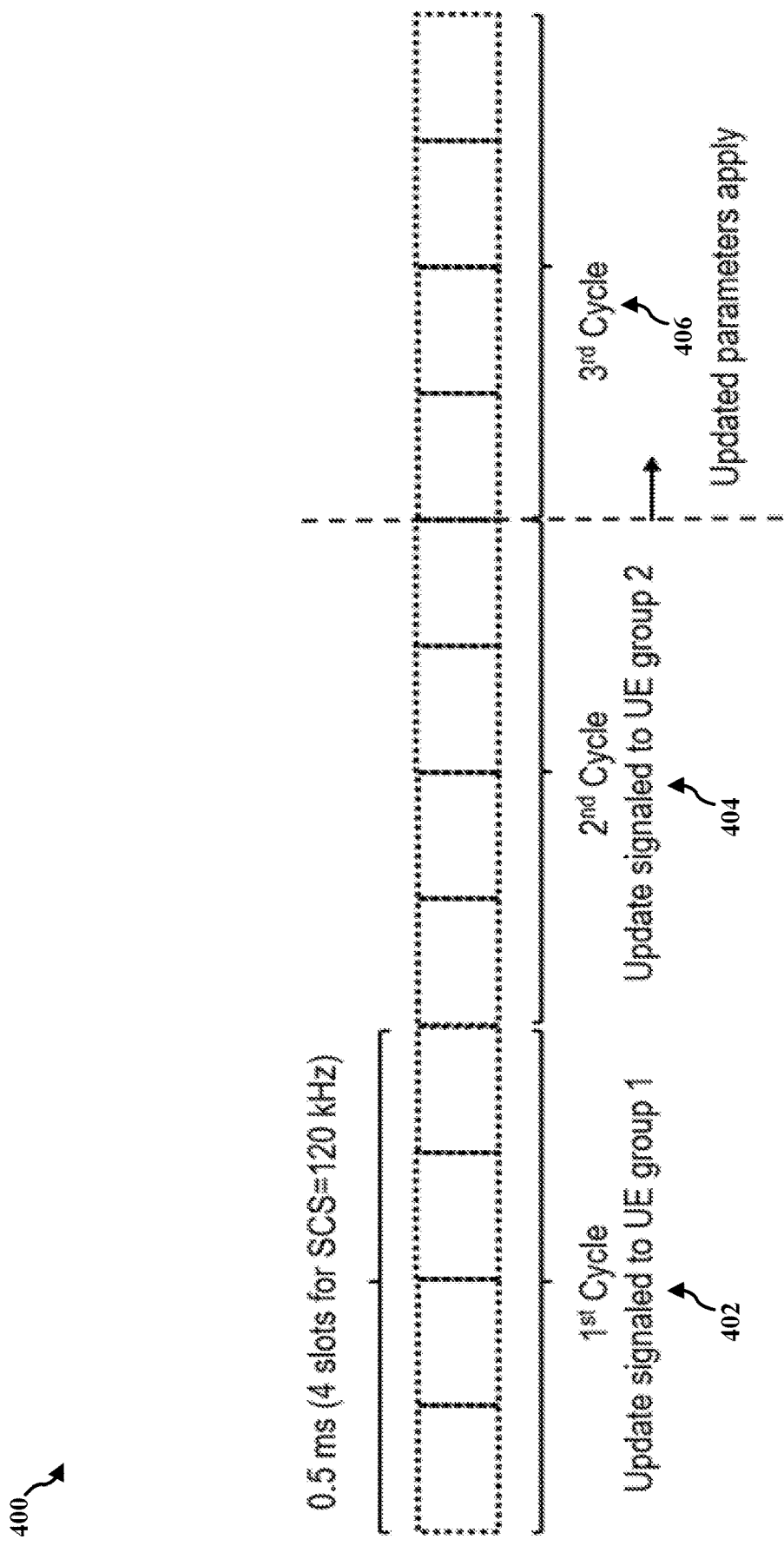

FIG. 4 is a diagram illustrating example cycles for signaling and application of an SPS/CG configuration update, in accordance with various aspects of the present disclosure.

Figures 5A, 5B, 5C:
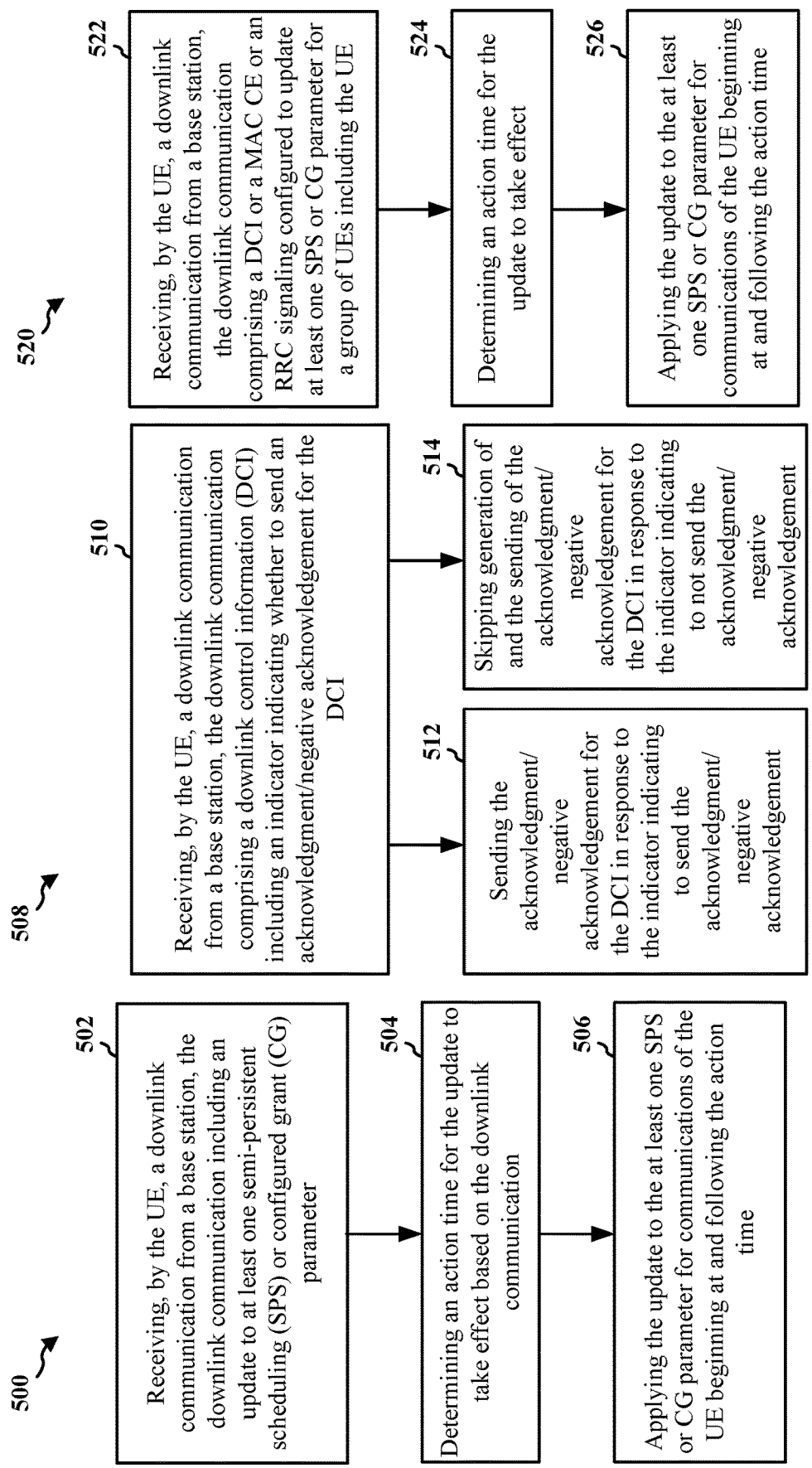

FIG. 5A is a flow chart illustrating a first example method at a UE for SPS functionality, in accordance with various aspects of the present disclosure.

FIG. 5B is a flow chart illustrating a second example method at a UE for SPS functionality, in accordance with various aspects of the present disclosure.

FIG. 5C is a flow chart illustrating a third example method at a UE for SPS functionality, in accordance with various aspects of the present disclosure.

FIG. 6A is a flow chart illustrating a first example method at a base station for SPS functionality, in accordance with various aspects of the present disclosure.

FIG. 6B is a flow chart illustrating a second example method at a base station for SPS functionality, in accordance with various aspects of the present disclosure.

FIG. 6C is a flow chart illustrating a third example method at a base station for SPS functionality, in accordance with various aspects of the present disclosure.

Figure 7:
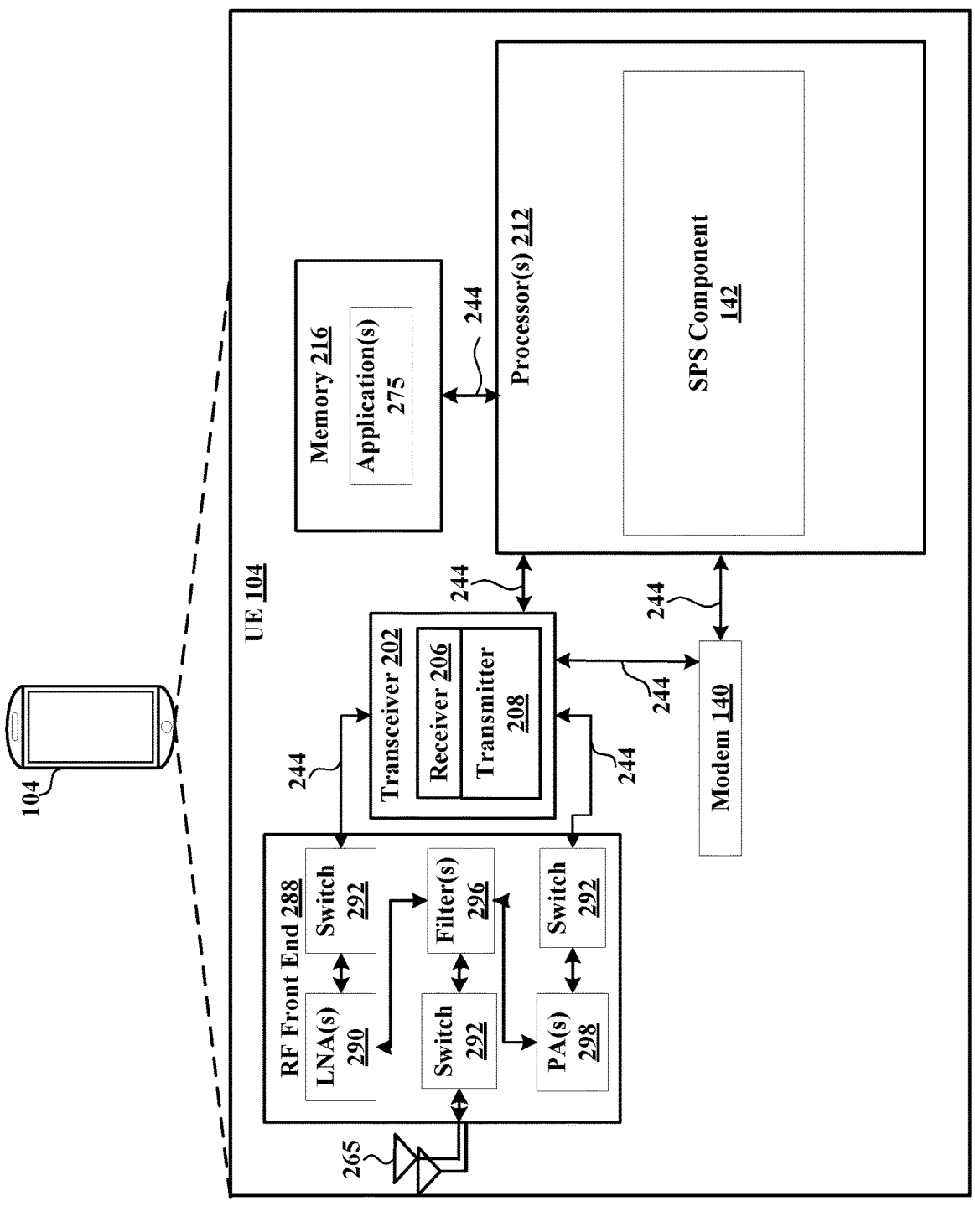

FIG. 7 is a block diagram illustrating example components of an example UE, in accordance with various aspects of the present disclosure.

Figure 8:
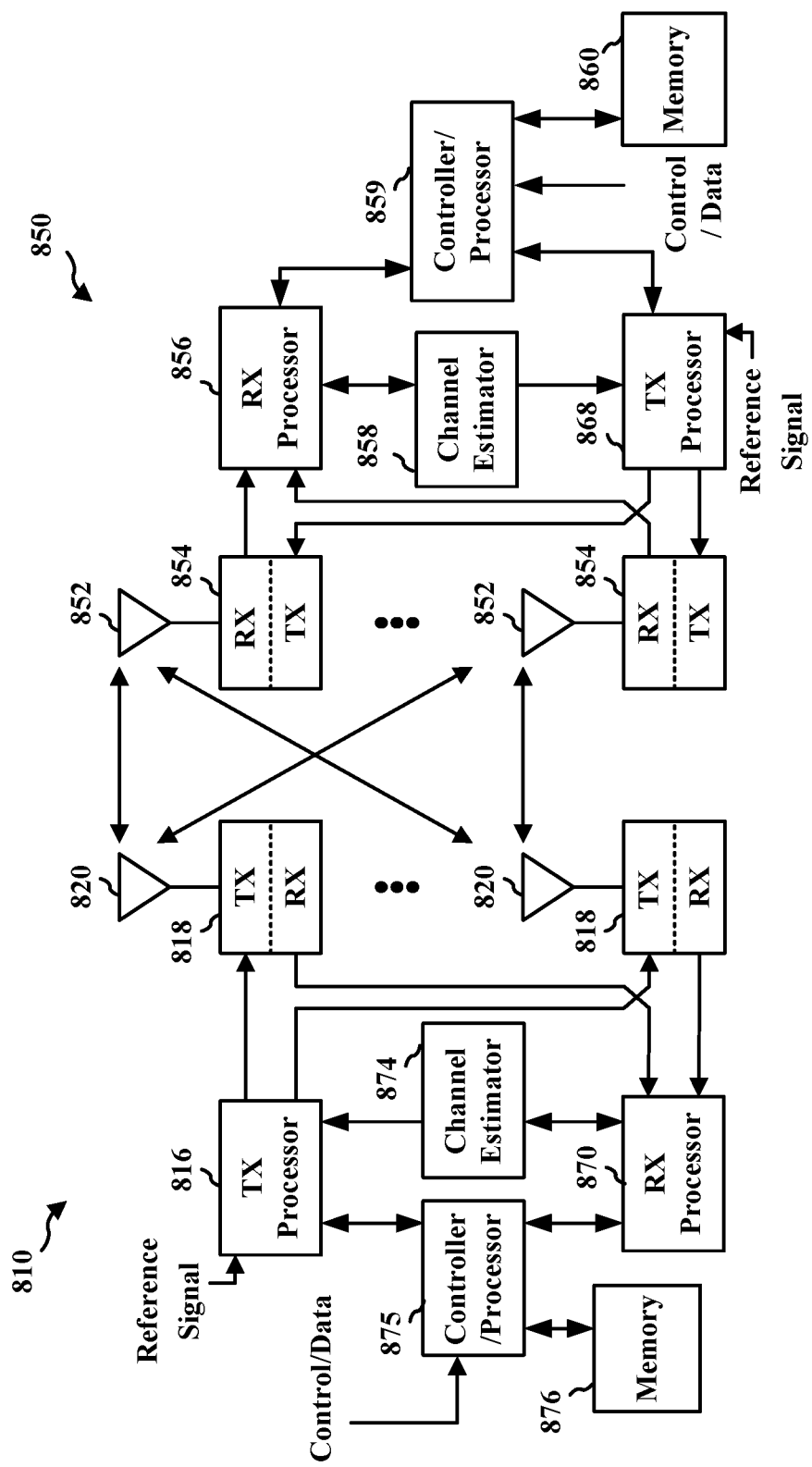

FIG. 8 is a diagram illustrating example components of a base station and a UE in an access network, in accordance with various aspects of the present disclosure.

Figure 9:
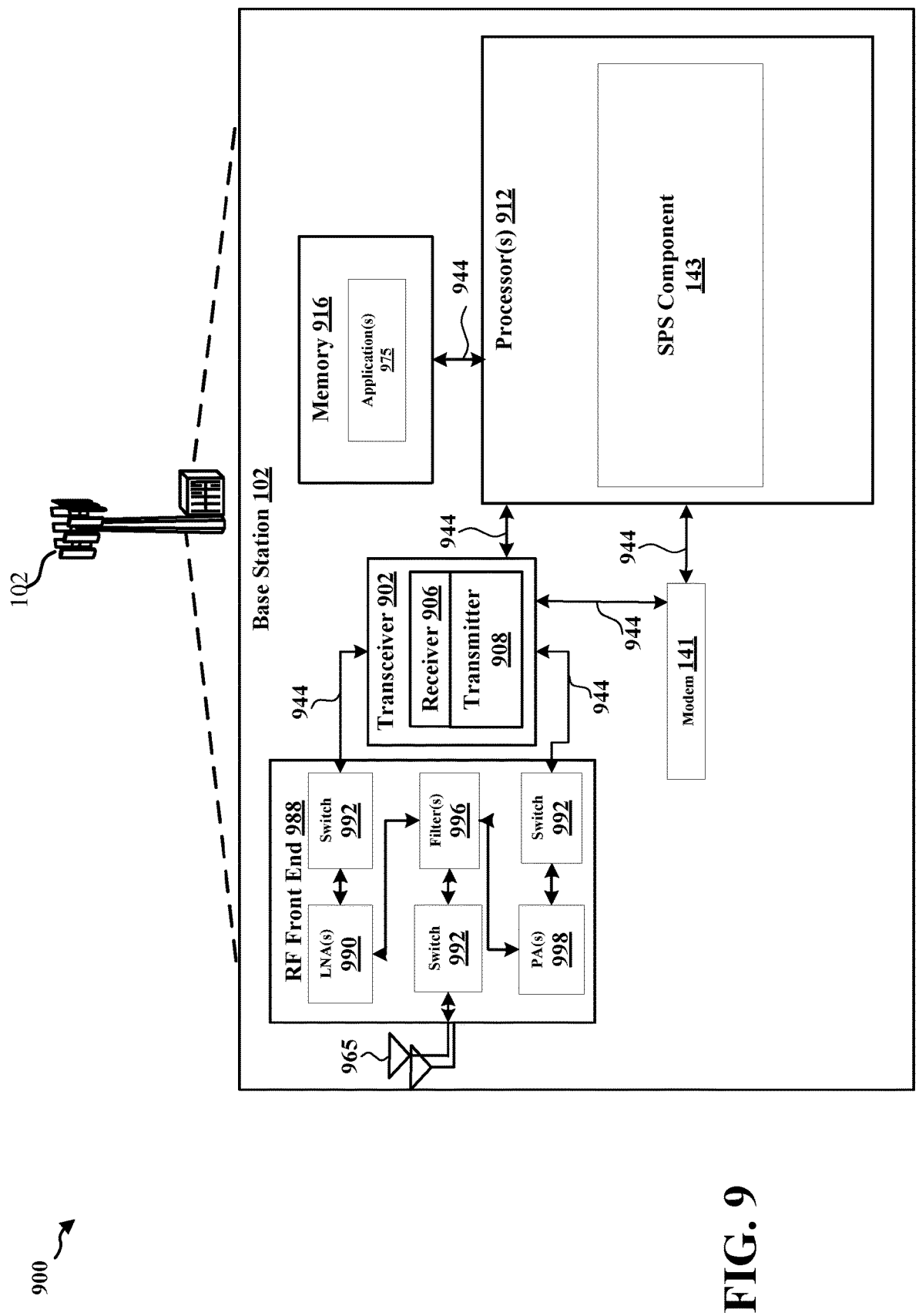

FIG. 9 is a block diagram illustrating example components of an example base station, in accordance with various aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Some present aspects relate to simultaneously updating semi-persistent scheduling (SPS) or configured grant (CG) parameters for multiple user equipments (UEs), for example, by configuring a common target action time for updated SPS or CG parameters to take effect for multiple UEs. As used herein, the term "simultaneous updating" means to update to take effect at a common or same time, such as in a synchronized manner. For example, the common or same time is the common target action time across multiple UEs. It should be understood that the actual transmission of the updated SPS or CG parameters, or reception of such parameters at each UE, may occur at different times. For example, in some implementations, the common action time may be a default action time, such as but not limited to an indicated amount of time after receiving a downlink communication indicating the SPS or CG parameter update or an amount of time after sending an Acknowledgement/Negative Acknowledgement (ACK/NACK) of receipt of the downlink communication. In other implementations, for instance, the common action time may be a non-default action time, such as but not limited to a relative time offset from the downlink communication indicating the SPS or CG parameter update, or an absolute time, e.g., expressed in frame index, subframe index, slot index, and symbol index. In some alternative and/or additional aspects, a base station, such as a gNodeB (gNB), may dynamically indicate the common action time for SPS or CG parameter update to take effect. In some further alternative and/or additional aspects, a base station may dynamically indicate, in each downlink control information (DCI), whether ACK/NACK should be sent for that DCI.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
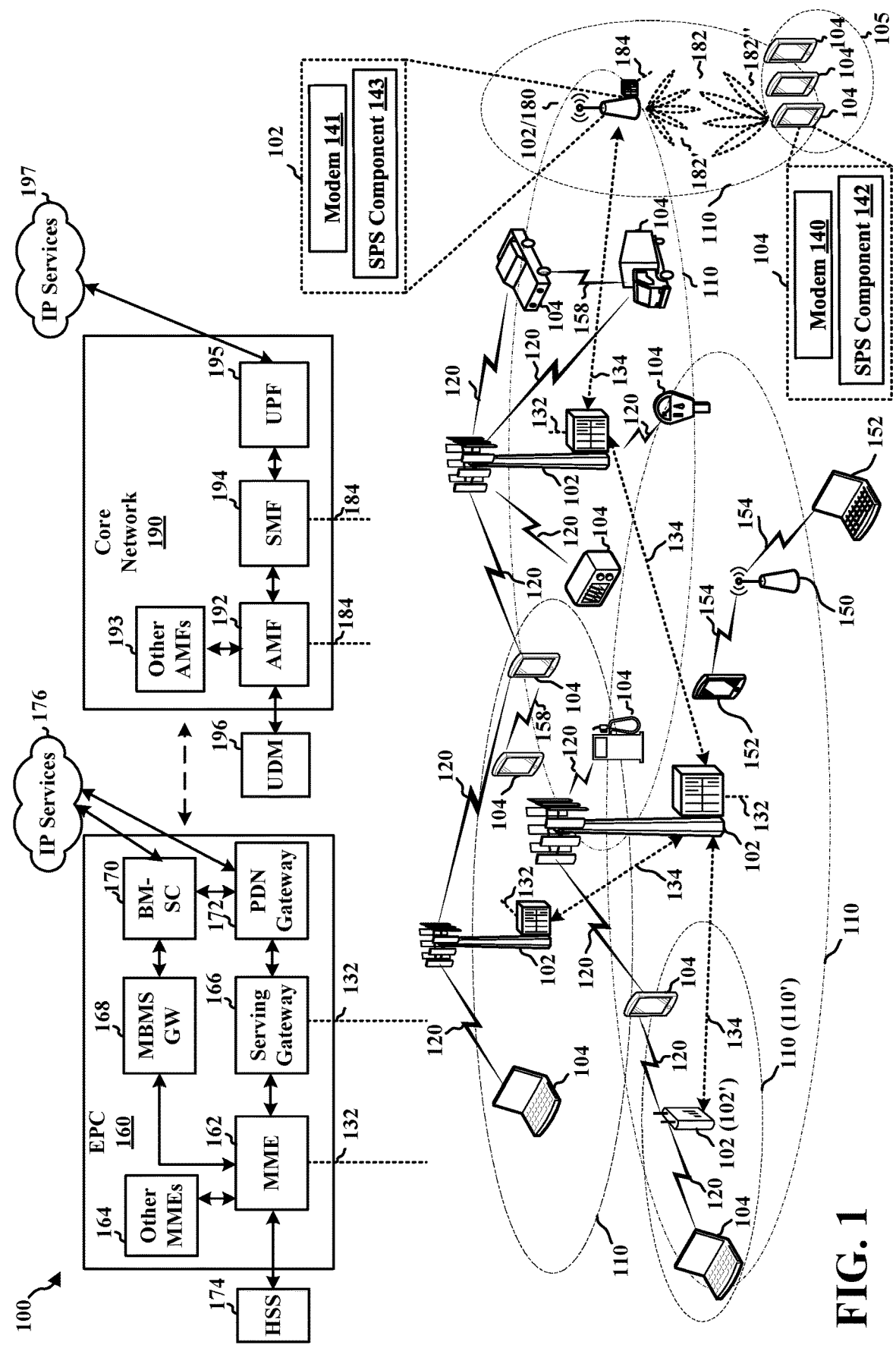
FIG. 1 is a diagram illustrating an example of a wireless communications system and an access network including components for updating semi-persistent scheduling (SPS)

FIG. 1 is a diagram illustrating an example of a wireless communications system and an access network 100 including UEs 104 that may be configured and activated by a base station 102 (e.g., a gNB) for SPS functionality. More specifically, for example, a UE 104 may include a modem 140 and an SPS component 142 configured to receive a physical downlink shared channel (PDSCH) from a base station 102 according to an SPS configuration, and/or to receive and implement updated SPS or CG parameters. The base station 102 may include a modem 141 and an SPS component 143 configured to transmit the PDSCH to one or more of the UEs 104. In an aspect, the base station 102 and SPS component 143 may generate and transmit SPS or configured grant (CG) parameters for a group of UEs 105 served by the base station 102 that may be updated to take effect across the group of UEs 105 in a synchronized manner, for example, by configuring a common target action time for the updated SPS or CG parameters to take effect for the group of UEs 105. In some alternative and/or additional aspects, the base station 102 may configure a DCI to dynamically indicate the action time to be used for SPS or CG parameter update for the UE 104. In some further alternative and/or additional aspects, the base station 102 may dynamically indicate, in each DCI, whether the UE 104 should send an ACK/NACK for that DCI.

Further details of the present aspects are described below.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same (e.g., 5 GHz, or the like) unlicensed frequency spectrum as may be used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include an eNB, gNodeB (gNB), or another type of base station. Some base stations, such as gNB 180 may operate in a traditional sub-6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring to FIGS. 2A-2D, one or more example frame structures, channels, and resources may be used for communication between the base stations 102 and UEs 104 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Referring to FIG. 3, an example diagram 300 includes downlink (e.g., PDSCH) and uplink (e.g., PUSCH) resource timing before 302 and after 304 an SPS or CG parameter update or reconfiguration. For example, a group of UEs 105 (e.g., UE 1, UE 2, . . . , UE N) may be configured and activated by a base station such as a gNB 102 for SPS functionality. Generally, SPS may provide for the scheduling of a periodic communication (e.g., an uplink communication or a downlink communication) for a UE. For example, the gNB 102 may configure and activate downlink SPS to schedule the UEs 105 to receive a PDSCH without a PDCCH for every transmission. Similarly, the gNB 102 may configure and activate uplink SPS to schedule the UEs to transmit a PUSCH without a PUCCH for every transmission.

The base station 102 may configure and/or activate the UEs 105 for SPS using at least one of a downlink control information (DCI), a medium access control-control element (MAC-CE, e.g., MAC layer control signaling in the payload), or a radio resource control (RRC) signaling. SPS configuration may include parameters such as a periodicity, a hybrid automatic repeat request (HARQ) resource on PUCCH, a number of HARQ processes for SPS, beam configuration, etc. The HARQ resource may carry an ACK or NACK indicating whether the PDSCH was correctly received. For example, in an aspect, SPS activation may be carried on a PDCCH DCI. The DCI may specify additional parameters of the SPS for the PDSCH, such as frequency domain resources, time domain resources, a modulation and coding scheme (MCS), a demodulation reference signal port (DMRS), a scrambling identifier for DMRS sequence generation, transmission configuration indicator (TCI) state, quasi co-location (QCL) type, beam to use and/or beam sweep, etc.

Still referring to FIG. 3, for example, in an aspect, the gNB 102 may configure "UE 1, UE 2, . . . , UE N" in the group of UEs 105 for SPS, and may reconfigure the SPS for "UE 1, UE 2, . . . , UE N" at a later time by SPS reconfiguration/reactivation. For example, before SPS reconfiguration/reactivation, for each one of "UE 1, UE 2, . . . , UE N," the gNB 102 may configure downlink and uplink transmission using a particular beam. For example, on the downlink, the gNB 102 may transmit two symbols to each of "UE 1, UE 2, . . . , UE N" back to back on PDSCH using a respective beam. On the uplink, "UE 1, UE 2, . . . , UE N" may each be configured by the gNB 102 with an uplink grant to transmit two symbols to the gNB 102 back to back on PUSCH using a respective beam.

Subsequently, for example, in one non-limiting aspect, if the gNB 102 determines that transmissions of "UE 1" have high blur rate, the gNB 102 may make the transmissions of "UE 1" more robust, for example, by reconfiguring/reactivating SPS or CG configuration of "UE 1" to enable replication by beam sweep. For example, the gNB 102 may reconfigure/reactivate "UE 1" so that each uplink and/or downlink packet of "UE 1" is sent by multiple beams (e.g., 3 different beams). Accordingly, if one beam gets blocked, the packet of "UE 1" may still be communicated via one of the other beams, thus improving reliability.

In an aspect, SPS/CG parameters per UE for the group of UEs 105 being served by the gNB 102 may need to be updated simultaneously, e.g., to take effect in a synchronized manner, for the group of UEs 105. For example, if "UE 1" is reconfigured/reactivated with beam sweep-based replication (e.g., receiving/transmitting each packet using three beams as in FIG. 3), the resource location offsets for the other UEs in the group of UEs 105 may need to be updated at the same time, e.g., at a common starting point, that such a beam sweep is enabled for "UE 1" in order to avoid errors or conflicts in the communications or to improve efficiency.

In an aspect, resource location offsets for the other UEs (UE 2, . . . , UE N) may have to be updated such as to minimize the total duration of SPS/CG transmissions for the entire group of UEs 105.

Referring to FIG. 4, in an aspect, for example, the SPS/CG communications of the group of UEs 105 may be configured to be repeated in periodic cycles, such as a first cycle 402, a second cycle 404, a third cycle 406, etc. In an aspect, a single cycle may be too short to finish updating SPS/CG parameters for all of "UE 1, UE 2, . . . , UE N" so that the updates can be applied in a next/subsequent cycle.

For example, for a subcarrier spacing (SCS) of 120 KHz, each cycle is 0.5 ms. In this case, a 0.5 ms cycle duration includes 4 slots and may include at most 12 PDCCH symbols (3 PDCCH symbols per slot), which may be used to update SPS/CG parameters for at most 12 UEs via DCI. In addition, sufficient time should be reserved for PDCCH decoding. For example, due to decoding latency, the last 2 slots of a cycle may not be used to send PDCCH for SPS/CG parameter updates that need to be applied at the start of the next cycle. More specifically, if PDCCH symbols are transmitted in the last 2 slots of a cycle, a UE may not finish decoding those PDCCH symbols before the start of the next cycle. Therefore, any SPS/CG parameter updates via PDCCH symbols transmitted in the last 2 slots of a cycle may not take effect at the start of the next cycle, and a UE may not be able to apply such parameters at the start of the next cycle. Accordingly, when a cycle includes 4 slots, only the first 2 slots of the cycle may be used for SPS/CG parameter update of at most 6 UEs. However, the group of UEs 105 may include more than 6 UEs (e.g., may include 10 or 20 UEs).

Accordingly, in some present aspects, to address the above, a common "action time" may be configured for synchronized updates for all UEs in the group of UEs 105 to take effect. For example, in an aspect, each activation/reactivation DCI or MAC-CE or RRC signaling for each UE may indicate a target action time for updated SPS/CG parameters to take effect for that UE, and such target action time may be common for a group of UEs 105.

For example, in an aspect, due to the number of UEs in the group of UEs 105, the group of UEs 105 may be split into two subgroups of UEs, and an activation/reactivation DCI in the first cycle 402 may indicate updated SPS/CG parameters for each UE in the first sub-group of UEs. Further, an activation/reactivation DCI in the second cycle 404 may indicate updated SPS/CG parameters for each UE in the second sub-group of UEs. In addition, in an aspect, each of the aforementioned activation/reactivation DCIs may also indicate a target action time common for the updated SPS/CG parameters to take effect for both sub-groups of UEs. For example, in an aspect, each of the aforementioned activation/reactivation DCIs may also indicate that for both sub-groups of UEs, the updated SPS/CG parameters should take effect at the start of the third cycle 406. As such, SPS/CG parameters may be updated simultaneously for the entire group of UEs 105 to take effect at the beginning of the third cycle 406.

In an aspect, for example, the action time for updated SPS/CG parameters to take effect may be a default action time. In an aspect, the default action time may depend on how the corresponding SPS/CG parameters are transmitted to a UE. For example, in an aspect, if SPS/CG parameters are updated by an activation/reactivation DCI without ACK/NACK, the default action time may be a predetermined number of milliseconds (e.g., 1 or 2 ms) after the end of DCI transmission. In another aspect, for example, if SPS/CG parameters are updated by an activation/reactivation DCI with ACK/NACK, the default action time may be a predetermined number of milliseconds after the end of ACK/NACK transmission. In a further aspect, for example, if SPS/CG parameters are updated by MAC-CE with ACK/NACK, the default action time may be a predetermined number of milliseconds after the end of ACK/NACK transmission.

Alternatively, in an aspect, for example, the action time may be a non-default action time used to align SPS/CG parameter update time across multiple UEs. For example, in an aspect, the non-default action time may be indicated in the activation/reactivation DCI or MAC-CE or RRC signaling transmitted by the gNB 102 to update such SPS/CG parameters.

In a further aspect, the non-default action time may be a relative time offset from the activation/reactivation DCI or MAC-CE or RRC signaling transmitted by the gNB 102 to update the SPS/CG parameters. In another aspect, the non-default action time may be an absolute time which may be expressed, for example, in an absolute unit of time such as a frame index, subframe index, slot index, symbol index, etc.

In some alternative and/or additional aspects, the gNB may dynamically indicate which type of action time to use for SPS/CG parameter update in DCI, MAC-CE, or RRC signaling. For example, a reserved value for the non-default action time in an activation/reactivation DCI may indicate that the default action time should be used. Otherwise, the indicated non-default action time may be used.

In some alternative and/or additional aspects, each DCI may dynamically indicate whether ACK/NACK should be configured/sent for that DCI. Accordingly, ACK/NACK configuration (e.g., whether to send ACK/NACK or not) may be dynamically decided/changed per DCI.

FIGS. 5A, 5B, and 5C illustrate flow charts of example methods 500, 508, and 520 for wireless communications for a UE. In an example, UE 104 may perform the functions described in any of methods 500, 508, or 520 using one or more of the components described in FIG. 1 above (e.g., modem 140 and/or SPS component 142 in FIG. 1) or in FIG. 7 below (e.g., antenna 265, RF front end 288, transceiver 202, modem 140, processor 212, memory 216, and/or SPS component 142 in FIG. 7).

Referring to FIG. 5A, at 502, the method 500 of wireless communication for a UE includes receiving, by the UE, a downlink communication from a base station, the downlink communication including an update to at least one SPS or CG parameter, where the downlink communication indicates whether to use a first action time or a second action time for the update to take effect. For example, in an aspect, the UE 104, the antenna 265, RF front end 288, transceiver 202, modem 140, processor 212, memory 216, and/or SPS component 142 may receive a downlink communication from the base station 102, the downlink communication including an update to at least one SPS or CG parameter, where the downlink communication indicates whether to use a first action time or a second action time for the update to take effect, as described above. For instance, the downlink communication may be a DCI or a MAC-CE carried by a wireless signal that is received and processed by the UE 104, and the downlink communication indicates whether to use a first action time or a second action time for the update to take effect, as describe herein. For example, in an aspect, the downlink communication may indicate an action time for the SPS or CG parameter update to take effect, where the action time is common to a group of UEs 105 served by the base station 102 and including the UE 104. Accordingly, in an aspect, the UE 104, the antenna 265, RF front end 288, transceiver 202, modem 140, processor 212, memory 216, and/or SPS component 142 may provide means for receiving a downlink communication from the base station 102, the downlink communication including an update to at least one SPS or CG parameter, where the downlink communication indicates whether to use a first action time or a second action time for the update to take effect.

At 504, the method 500 further includes determining an action time for the update to take effect based on the downlink communication. For example, in an aspect, the UE 104, modem 140, processor 212, memory 216, and/or SPS component 142 may determine an action time for the update to take effect based on the downlink communication, as described above. For instance, the UE 104 may determine the action time by decoding an indication in the downlink communication. Accordingly, in an aspect, the UE 104, modem 140, processor 212, memory 216, and/or SPS component 142 may provide means for determining an action time for the update to take effect based on the downlink communication.

At 506, the method 500 further includes applying the update to the at least one SPS or CG parameter for communications of the UE beginning at and following the action time. For example, in an aspect, the UE 104, modem 140, processor 212, memory 216, and/or SPS component 142 may apply the at least one SPS or CG parameter update for communications of the UE 104 beginning at and following the action time, as described above. For instance, the UE 104 may determine the action time by decoding an indication in the downlink communication. Accordingly, in an aspect, the UE 104, modem 140, processor 212, memory 216, and/or SPS component 142 may provide means for applying the at least one SPS or CG parameter update for communications of the UE 104 beginning at and following the action time.

Optionally or in addition, the first action time may be a default action time whose value is determined based on a rule.

Optionally or in addition, the downlink communication may be an activation/reactivation DCI that does not require an acknowledgement message or a negative acknowledgement message, where the default action time is an amount of time after receiving the activation/reactivation DCI.

Optionally or in addition, the downlink communication may be an activation/reactivation DCI that requires an acknowledgement message or a negative acknowledgement message, where the default action time is an amount of time after transmitting the acknowledgement message or the negative acknowledgement message in response to the activation/reactivation DCI.

Optionally or in addition, the downlink communication may be a MAC CE that requires an acknowledgement message or a negative acknowledgement message, where the default action time is an amount of time after transmitting the acknowledgement message or the negative acknowledgement message in response to the MAC CE.

Optionally or in addition, the second action time may be a non-default action time whose value is dynamically indicated by the base station 102.

Optionally or in addition, the non-default action time may be common to a group of UEs, where one or more SPS or CG parameters are updated in a synchronized manner across the group of UEs 105 at the non-default action time.

Optionally or in addition, the downlink communication that updates the at least one SPS or CG parameter may be an activation/reactivation DCI or a MAC CE, where the non-default action time is indicated in the activation/reactivation DCI or the MAC CE.

Optionally or in addition, the non-default action time may be a relative time offset with reference to the activation/reactivation DCI or the MAC CE.

Optionally or in addition, the non-default action time may be an absolute time.

Optionally or in addition, the absolute time may be expressed in one of a frame index, a subframe index, a slot index, or a symbol index.

Optionally or in addition, the downlink communication that updates the at least one SPS or CG parameter may be a DCI or a MAC CE or an RRC signaling, where the DCI or the MAC CE or the RRC signaling dynamically indicates whether to use the first action time or the second action time for the update to take effect.

Optionally or in addition, the first action time may be a default action time and the second action time may be a non-default action time, where the downlink communication that updates the at least one SPS or CG parameter includes an activation/reactivation DCI that indicates an action time value, where the action time value being equal to a reserved value indicates to use the default action time, where the action time value not being equal to the reserved value indicates to use the action time value as the non-default action time. For example in an aspect, when the activation/reactivation DCI includes the reserved value, the default action time may be used, and when the activation/reactivation DCI includes a value different than the reserved value, such different value may be used as the non-default action time.

Referring to FIG. 5B, at 510, the method 508 of wireless communication for a UE includes receiving, by the UE, a downlink communication from a base station, the downlink communication including a DCI, the DCI including an indicator indicating whether to configure an ACK/NACK for the DCI. For example, in an aspect, the UE 104, the antenna 265, RF front end 288, transceiver 202, modem 140, processor 212, memory 216, and/or SPS component 142 may receive a downlink communication from the base station 102, the downlink communication including a DCI including an indicator indicating whether to configure an ACK/NACK for the DCI, as described above. Accordingly, in an aspect, the UE 104, the antenna 265, RF front end 288, transceiver 202, modem 140, processor 212, memory 216, and/or SPS component 142 may provide means for receiving a downlink communication from the base station 102, the downlink communication including a DCI including an indicator indicating whether to configure an ACK/NACK for the DCI.

At 512, the method 508 may further include sending the ACK/NACK for the DCI in response to the indicator indicating to configure the ACK/NACK. For example, in an aspect, the UE 104, modem 140, processor 212, memory 216, and/or SPS component 142 may send the ACK/NACK for the DCI in response to the indicator indicating to send the ACK/NACK, as described above. Accordingly, in an aspect, the UE 104, modem 140, processor 212, memory 216, and/or SPS component 142 may provide means for sending the ACK/NACK for the DCI in response to the indicator indicating to send the ACK/NACK.

At 514, the method 508 may further include skipping generation of and the sending of the ACK/NACK for the DCI in response to the indicator indicating to not send the ACK/NACK. For example, in an aspect, the UE 104, modem 140, processor 212, memory 216, and/or SPS component 142 may skip generation of and the sending of the ACK/NACK for the DCI in response to the indicator indicating to not send the ACK/NACK, as described above. Accordingly, in an aspect, the UE 104, modem 140, processor 212, memory 216, and/or SPS component 142 may provide means for skipping generation of and the sending of the ACK/NACK for the DCI in response to the indicator indicating to not send the ACK/NACK.

Referring to FIG. 5C, at 522, the method 520 of wireless communication for a UE includes receiving, by the UE, a downlink communication from a base station, the downlink communication including a DCI or a MAC CE or an RRC signaling configured to update at least one SPS or CG parameter for a group of UEs including the UE. For example, in an aspect, the UE 104, modem 140, processor 212, memory 216, and/or SPS component 142 may receive a downlink communication from a base station 102, the downlink communication including a DCI or a MAC CE or an RRC signaling configured to update at least one SPS or CG parameter for a group of UEs 105 including the UE 104, as described above. Accordingly, in an aspect, the UE 104, modem 140, processor 212, memory 216, and/or SPS component 142 may provide means for receiving a downlink communication from a base station 102, the downlink communication including a DCI or a MAC CE or an RRC signaling configured to update at least one SPS or CG parameter for a group of UEs 105 including the UE 104.

At 524, the method 520 further includes determining an action time for the update to take effect based on the downlink communication. For example, in an aspect, the UE 104, modem 140, processor 212, memory 216, and/or SPS component 142 may determine an action time for the update to take effect based on the downlink communication, as described above. Accordingly, in an aspect, the UE 104, modem 140, processor 212, memory 216, and/or SPS component 142 may provide means for determining an action time for the update to take effect based on the downlink communication.

At 526, the method 520 further includes applying the update to the at least one SPS or CG parameter for communications of the UE beginning at and following the action time. For example, in an aspect, the UE 104, modem 140, processor 212, memory 216, and/or SPS component 142 may apply the update to the at least one SPS or CG parameter for communications of the UE 104 beginning at and following the action time, as described above. Accordingly, in an aspect, the UE 104, modem 140, processor 212, memory 216, and/or SPS component 142 may provide means for applying the update to the at least one SPS or CG parameter for communications of the UE 104 beginning at and following the action time.

Optionally or in addition, the action time may be a default action time which is common to the group of UEs 105, where one or more SPS or CG parameters are updated in a synchronized manner across the group of UEs 105 at the default action time.

FIGS. 6A, 6B, and 6C illustrate flow charts of example methods 600, 608, and 620 for wireless communications for a base station. In an example, the base station 102 may perform the functions described in any of methods 600, 608, or 620 using one or more of the components described in FIG. 1 above (e.g., modem 141 and/or SPS component 143) or in FIG. 9 below (e.g., antenna 965, RF front end 988, transceiver 902, modem 141, processor 912, memory 916, and/or SPS component 143 in FIG. 9).

Referring to FIG. 6A, at 602, the method 600 of wireless communication for a base station includes transmitting, by the base station, a downlink communication to a UE, the downlink communication including an update to at least one SPS or CG parameter, where the downlink communication indicates whether to use a first action time or a second action time for the update to take effect. For example, in an aspect, the base station 102, the antenna 965, RF front end 988, transceiver 902, modem 141, processor 912, memory 916, and/or SPS component 143 may transmit a downlink communication to the UE 104, the downlink communication including an update to at least one SPS or CG parameter, where the downlink communication indicates whether to use a first action time or a second action time for the update to take effect, as described above. For instance, the downlink communication may be a DCI or a MAC-CE carried by a wireless signal that is transmitted by the base station 102, and the downlink communication indicates whether to use a first action time or a second action time for the update to take effect, as describe herein. For example, in an aspect, the downlink communication may indicate an action time for the SPS or CG parameter update to take effect, where the action time is common to a group of UEs 105 served by the base station 102 and including the UE 104. Accordingly, in an aspect, the base station 102, the antenna 965, RF front end 988, transceiver 902, modem 141, processor 912, memory 916, and/or SPS component 143 may provide means for transmitting a downlink communication to the UE 104, the downlink communication including an update to at least one SPS or CG parameter, where the downlink communication indicates whether to use a first action time or a second action time for the update to take effect.

At 604, the method 600 further includes applying the update to the at least one SPS or CG parameter for communications with the UE beginning at and following an action time based on the downlink communication. For example, in an aspect, the base station 102, the antenna 965, RF front end 988, transceiver 902, modem 141, processor 912, memory 916, and/or SPS component 143 may apply the update to the at least one SPS or CG parameter for communications with the UE 104 beginning at and following an action time based on the downlink communication, as described above. Accordingly, in an aspect, the base station 102, the antenna 965, RF front end 988, transceiver 902, modem 141, processor 912, memory 916, and/or SPS component 143 may provide means for applying the update to the at least one SPS or CG parameter for communications with the UE 104 beginning at and following an action time based on the downlink communication.

Optionally or in addition, the first action time may be a default action time whose value is determined based on a rule.

Optionally or in addition, the downlink communication may be an activation/reactivation DCI that does not require an acknowledgement message or a negative acknowledgement message, where the default action time is an amount of time after receiving the activation/reactivation DCI.

Optionally or in addition, the downlink communication may be an activation/reactivation DCI that requires an acknowledgement message or a negative acknowledgement message, where the default action time is an amount of time after transmitting the acknowledgement message or the negative acknowledgement message in response to the activation/reactivation DCI.

Optionally or in addition, the downlink communication may be a MAC CE that requires an acknowledgement message or a negative acknowledgement message, where the default action time is an amount of time after transmitting the acknowledgement message or the negative acknowledgement message in response to the MAC CE.

Optionally or in addition, the second action time may be a non-default action time whose value is dynamically indicated by the base station.

Optionally or in addition, the non-default action time may be common to a group of UEs 105, where one or more SPS or CG parameters are updated in a synchronized manner across the group of UEs 105 at the non-default action time.

Optionally or in addition, the downlink communication that updates the at least one SPS or CG parameter may be an activation/reactivation DCI or a MAC CE, where the non-default action time is indicated in the activation/reactivation DCI or the MAC CE.

Optionally or in addition, the non-default action time may be a relative time offset with reference to the activation/reactivation DCI or the MAC CE.

Optionally or in addition, the non-default action time may be an absolute time.

Optionally or in addition, the absolute time may be expressed in one of a frame index, a subframe index, a slot index, or a symbol index.

Optionally or in addition, the downlink communication that updates the at least one SPS or CG parameter may be a DCI or a MAC CE or an RRC signaling, where the DCI or the MAC CE or the RRC signaling dynamically indicates whether to use the first action time or the second action time for the update to take effect.

Optionally or in addition, the first action time may be a default action time and the second action time may be a non-default action time, where the downlink communication that updates the at least one SPS or CG parameter comprises an activation/reactivation DCI that indicates an action time value, where the action time value being equal to a reserved value indicates to use the default action time, where the action time value not being equal to the reserved value indicates to use the action time value as the non-default action time.

Referring to FIG. 6B, at 610, the method 608 of wireless communication for a base station includes transmitting, by the base station, a downlink communication to a UE, the downlink communication including a DCI including an indicator indicating whether to configure an ACK/NACK for the DCI. For example, in an aspect, the base station 102, the antenna 965, RF front end 988, transceiver 902, modem 141, processor 912, memory 916, and/or SPS component 143 may transmit a downlink communication to the UE 104, the downlink communication including a DCI including an indicator indicating whether to configure an ACK/NACK for the DCI, as described above. Accordingly, in an aspect, the base station 102, the antenna 965, RF front end 988, transceiver 902, modem 141, processor 912, memory 916, and/or SPS component 143 may provide means for transmitting a downlink communication to the UE 104, the downlink communication including a DCI including an indicator indicating whether to configure an ACK/NACK for the DCI.

At 612, the method 608 may further include receiving the ACK/NACK for the DCI in response to the indicator indicating to configure the ACK/NACK. For example, in an aspect, the base station 102, the antenna 965, RF front end 988, transceiver 902, modem 141, processor 912, memory 916, and/or SPS component 143 may receive the ACK/NACK for the DCI in response to the indicator indicating to send the ACK/NACK, as described above. Accordingly, in an aspect, the base station 102, the antenna 965, RF front end 988, transceiver 902, modem 141, processor 912, memory 916, and/or SPS component 143 may provide means for receiving the ACK/NACK for the DCI in response to the indicator indicating to send the ACK/NACK.

At 614, the method 608 may further include skipping the receiving of the ACK/NACK for the DCI in response to the indicator indicating to not send the ACK/NACK. For example, in an aspect, the base station 102, the antenna 965, RF front end 988, transceiver 902, modem 141, processor 912, memory 916, and/or SPS component 143 may skip the receiving of the ACK/NACK for the DCI in response to the indicator indicating to not send the ACK/NACK, as described above. Accordingly, in an aspect, the base station 102, the antenna 965, RF front end 988, transceiver 902, modem 141, processor 912, memory 916, and/or SPS component 143 may provide means for skipping the receiving of the ACK/NACK for the DCI in response to the indicator indicating to not send the ACK/NACK.

Referring to FIG. 6C, at 622, the method 620 includes transmitting, by the base station, a downlink communication to a group of UEs, the downlink communication including a DCI or a MAC CE or an RRC signaling configured to update at least one SPS or CG parameter for the group of UEs. For example, in an aspect, the base station 102, the antenna 965, RF front end 988, transceiver 902, modem 141, processor 912, memory 916, and/or SPS component 143 may transmit a downlink communication to a group of UEs 105, the downlink communication including a DCI or a MAC CE or an RRC signaling configured to update at least one SPS or CG parameter for the group of UEs 105, as described above. Accordingly, in an aspect, the base station 102, the antenna 965, RF front end 988, transceiver 902, modem 141, processor 912, memory 916, and/or SPS component 143 may provide means for transmitting a downlink communication to a group of UEs 105, the downlink communication including a DCI or a MAC CE or an RRC signaling configured to update at least one SPS or CG parameter for the group of UEs 105.

At 624, the method 620 further includes applying the update to the at least one SPS or CG parameter for communications of the group of UEs beginning at and following an action time. For example, in an aspect, the base station 102, the antenna 965, RF front end 988, transceiver 902, modem 141, processor 912, memory 916, and/or SPS component 143 may apply the update to the at least one SPS or CG parameter for communications of the group of UEs 105 beginning at and following an action time, as described above. Accordingly, in an aspect, the base station 102, the antenna 965, RF front end 988, transceiver 902, modem 141, processor 912, memory 916, and/or SPS component 143 may provide means for applying the update to the at least one SPS or CG parameter for communications of the group of UEs 105 beginning at and following an action time.

Optionally or in addition, the action time may be a default action time which is common to the group of UEs 105, where one or more SPS or CG parameters are updated in a synchronized manner across the group of UEs at the default action time.

Referring to FIG. 7, one example of an implementation of UE 104 may include a variety of components, some of which have already been described above and are described further herein, including components such as one or more processors 212 and memory 216 and transceiver 202 in communication via one or more buses 244, which may operate in conjunction with modem 140 and/or SPS component 142 to enable one or more of the functions described herein related to SPS.

In an aspect, the one or more processors 212 can include a modem 140 and/or can be part of the modem 140 that uses one or more modem processors. Thus, the various functions related to SPS component 142 may be included in modem 140 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 140 associated with SPS component 142 may be performed by transceiver 202.

Also, memory 216 may be configured to store data used herein and/or local versions of applications 275 or SPS component 142 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining SPS component 142 and/or one or more of its subcomponents, and/or data associated therewith, when UE 104 is operating at least one processor 212 to execute SPS component 142 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 140 can configure transceiver 202 to operate at a specified frequency and power level based on the UE configuration of the UE 104 and the communication protocol used by modem 140.

In an aspect, modem 140 can be a multiband-multimode modem, which can process digital data and communicate with transceiver 202 such that the digital data is sent and received using transceiver 202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Although illustrated as being associated with the processor 212, it should be understood that the functionality of the SPS component 142 may alternatively be implemented by the modem 140.

In an aspect, the processor(s) 212 may correspond to one or more of the processors described in connection with UE 850 in FIG. 8 below. Similarly, the memory 216 may correspond to the memory described in connection with UE 850 in FIG. 8 below.

In one configuration, UE 104 or UE 850 may be an apparatus for wireless communication including means for performing any of the appended claims for wireless communication by a UE. The aforementioned means may be one or more of the aforementioned components of UE 104 and/or processor 212 of UE 104 configured to perform the functions recited by the aforementioned means. As described supra, processor 212 may include the TX Processor 868, the RX Processor 856, and the controller/processor 859 of UE 850 described below with reference to FIG. 8. As such, in one configuration, the aforementioned means may be the TX Processor 868, the RX Processor 856, and the controller/processor 859 configured to perform the functions recited by the aforementioned means.

FIG. 8 is a block diagram of a base station 810 in communication with a UE 850 in an access network, where the base station 810 may be an example implementation of base station 102 and where UE 850 may be an example implementation of UE 104. In the DL, IP packets from the EPC 160 may be provided to a controller/processor 875. The controller/processor 875 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 875 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 816 and the receive (RX) processor 870 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 816 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 874 may be used to determine the coding and modulation scheme, as well as for spatial processing. The channel estimate may be derived from a reference signal and/or channel condition feedback transmitted by the UE 850. Each spatial stream may then be provided to a different antenna 820 via a separate transmitter 818TX. Each transmitter 818TX may modulate an RF carrier with a respective spatial stream for transmission.

At the UE 850, each receiver 854RX receives a signal through its respective antenna 852. Each receiver 854RX recovers information modulated onto an RF carrier and provides the information to the receive (RX) processor 856. The TX processor 868 and the RX processor 856 implement layer 1 functionality associated with various signal processing functions. The RX processor 856 may perform spatial processing on the information to recover any spatial streams destined for the UE 850. If multiple spatial streams are destined for the UE 850, they may be combined by the RX processor 856 into a single OFDM symbol stream. The RX processor 856 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 810. These soft decisions may be based on channel estimates computed by the channel estimator 858. The soft decisions are then decoded and deinterleaved to recover the data and control signals that were originally transmitted by the base station 810 on the physical channel. The data and control signals are then provided to the controller/processor 859, which implements layer 3 and layer 2 functionality.

The controller/processor 859 can be associated with a memory 860 that stores program codes and data. The memory 860 may be referred to as a computer-readable medium. In the UL, the controller/processor 859 provides demultiplexing between transport and logical channels, packet reassembly, deciphering, header decompression, and control signal processing to recover IP packets from the EPC 160. The controller/processor 859 is also responsible for error detection using an ACK and/or NACK protocol to support HARQ operations.

Similar to the functionality described in connection with the DL transmission by the base station 810, the controller/processor 859 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 858 from a reference signal or feedback transmitted by the base station 810 may be used by the TX processor 868 to select the appropriate coding and modulation schemes, and to facilitate spatial processing. The spatial streams generated by the TX processor 868 may be provided to different antenna 852 via separate transmitters 854TX. Each transmitter 854TX may modulate an RF carrier with a respective spatial stream for transmission.

The UL transmission is processed at the base station 810 in a manner similar to that described in connection with the receiver function at the UE 850. Each receiver 818RX receives a signal through its respective antenna 820. Each receiver 818RX recovers information modulated onto an RF carrier and provides the information to a RX processor 870.

The controller/processor 875 can be associated with a memory 876 that stores program codes and data. The memory 876 may be referred to as a computer-readable medium. In the UL, the controller/processor 875 provides demultiplexing between transport and logical channels, packet reassembly, deciphering, header decompression, control signal processing to recover IP packets from the UE 850. IP packets from the controller/processor 875 may be provided to the EPC 160. The controller/processor 875 is also responsible for error detection using an ACK and/or NACK protocol to support HARQ operations.

At least one of the TX processor 868, the RX processor 856, and the controller/processor 859 may be configured to perform aspects in connection with SPS component 142 of FIG. 1.

At least one of the TX processor 816, the RX processor 870, and the controller/processor 875 may be configured to perform aspects in connection with SPS component 143 of FIG. 1.

Referring to FIG. 9, one example of an implementation of base station 102 may include a variety of components, some of which have already been described above and are described further herein, including components such as one or more processors 912 and memory 916 and transceiver 902 in communication via one or more buses 944, which may operate in conjunction with modem 141 and/or SPS component 143 to enable one or more of the functions described herein related to SPS.

In an aspect, the one or more processors 912 can include a modem 141 and/or can be part of the modem 141 that uses one or more modem processors. Thus, the various functions related to SPS component 143 may be included in modem 141 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 141 associated with SPS component 143 may be performed by transceiver 902.

Also, memory 916 may be configured to store data used herein and/or local versions of applications 975 or SPS component 143 and/or one or more of its subcomponents being executed by at least one processor 912. Memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining SPS component 143 and/or one or more of its subcomponents, and/or data associated therewith, when base station 102 is operating at least one processor 912 to execute SPS component 143 and/or one or more of its subcomponents.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one UE 104. Additionally, receiver 906 may process such received signals, and also may obtain measurements of the signals, such as, but not limited to, Ec/Io, signal-to-noise ratio (SNR), reference signal received power (RSRP), received signal strength indicator (RSSI), etc. Transmitter 908 may include hardware, firmware, and/or software code executable by a processor for transmitting data, the code comprising instructions and being stored in a memory (e.g., computer-readable medium). A suitable example of transmitter 908 may including, but is not limited to, an RF transmitter.

Moreover, in an aspect, base station 102 may include RF front end 988, which may operate in communication with one or more antennas 965 and transceiver 902 for receiving and transmitting radio transmissions, for example, wireless communications transmitted by other base stations 102 or wireless transmissions transmitted by UE 104. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

In an aspect, LNA 990 can amplify a received signal at a desired output level. In an aspect, each LNA 990 may have a specified minimum and maximum gain values. In an aspect, RF front end 988 may use one or more switches 992 to select a particular LNA 990 and its specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and its specified gain value based on a desired gain value for a particular application.

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver may be tuned to operate at specified frequencies such that base station 102 can communicate with, for example, one or more UEs 104 or one or more cells associated with one or more other base stations 102. In an aspect, for example, modem 141 can configure transceiver 902 to operate at a specified frequency and power level based on the base station configuration of the base station 102 and the communication protocol used by modem 141.

In an aspect, modem 141 can be a multiband-multimode modem, which can process digital data and communicate with transceiver 902 such that the digital data is sent and received using transceiver 902. In an aspect, modem 141 can be multiband and be configured to support multiple frequency bands for a specific communications protocol. In an aspect, modem 141 can be multimode and be configured to support multiple operating networks and communications protocols. In an aspect, modem 141 can control one or more components of base station 102 (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on base station configuration information associated with base station 102.

Although illustrated as being associated with the processor 912, it should be understood that the functionality of the SPS component 143 may alternatively be implemented by the modem 141.

In an aspect, the processor(s) 912 may correspond to one or more of the processors described in connection with base station 810 in FIG. 8 above. Similarly, the memory 916 may correspond to the memory described in connection with base station 810 in FIG. 8 above.

In one configuration, base station 102 or base station 810 may be an apparatus for wireless communication including means for performing any of the appended claims for wireless communication by a base station. The aforementioned means may be one or more of the aforementioned components of base station 102 and/or processor 912 of base station 810 configured to perform the functions recited by the aforementioned means. As described supra, processor 912 may include the TX Processor 816, the RX Processor 870, and the controller/processor 875 of base station 810 described above with reference to FIG. 8. As such, in one configuration, the aforementioned means may be the TX Processor 816, the RX Processor 870, and the controller/processor 875 configured to perform the functions recited by the aforementioned means.

Some Further Example Implementations

An example method for wireless communication for a user equipment (UE), comprising receiving, by the UE, a downlink communication from a base station, the downlink communication including an update to at least one semi-persistent scheduling (SPS) or configured grant (CG) parameter, wherein the downlink communication indicates whether to use a first action time or a second action time for the update to take effect; determining an action time for the update to take effect based on the downlink communication; and applying the update to the at least one SPS or CG parameter for communications of the UE beginning at and following the action time.

The above method of wireless communication for a user equipment (UE), wherein the first action time is a default action time whose value is determined based on a rule.

Any of the above methods of wireless communication for a user equipment (UE), wherein: the downlink communication comprises an activation/reactivation downlink control information (DCI) that does not require an acknowledgement message or a negative acknowledgement message, wherein the default action time is an amount of time after receiving the activation/reactivation DCI, or the downlink communication comprises an activation/reactivation downlink control information (DCI) that requires an acknowledgement message or a negative acknowledgement message, wherein the default action time is an amount of time after transmitting the acknowledgement message or the negative acknowledgement message in response to the activation/reactivation DCI, or the downlink communication comprises a medium access control (MAC) control element (CE) that requires an acknowledgement message or a negative acknowledgement message, wherein the default action time is an amount of time after transmitting the acknowledgement message or the negative acknowledgement message in response to the MAC CE.

Any of the above methods of wireless communication for a user equipment (UE), wherein the second action time is a non-default action time whose value is dynamically indicated by the base station.

Any of the above methods of wireless communication for a user equipment (UE), wherein the non-default action time is common to a group of UEs, wherein one or more SPS or CG parameters are updated in a synchronized manner across the group of UEs at the non-default action time.

Any of the above methods of wireless communication for a user equipment (UE), wherein the downlink communication that updates the at least one SPS or CG parameter comprises an activation/reactivation downlink control information (DCI) or a medium access control (MAC) control element (CE), wherein the non-default action time is indicated in the activation/reactivation DCI or the MAC CE.

Any of the above methods of wireless communication for a user equipment (UE), wherein: the non-default action time is a relative time offset with reference to the activation/reactivation DCI or the MAC CE, or the non-default action time is an absolute time.

Any of the above methods of wireless communication for a user equipment (UE), wherein the absolute time is expressed in one of a frame index, a subframe index, a slot index, or a symbol index.

Any of the above methods of wireless communication for a user equipment (UE), wherein the downlink communication that updates the at least one SPS or CG parameter comprises a downlink control information (DCI) or a medium access control (MAC) control element (CE) or a radio resource control (RRC) signaling, wherein the DCI or the MAC CE or the RRC signaling dynamically indicates whether to use the first action time or the second action time for the update to take effect.

Any of the above methods of wireless communication for a user equipment (UE), wherein the first action time is a default action time and the second action time is a non-default action time, wherein the downlink communication that updates the at least one SPS or CG parameter comprises an activation/reactivation DCI that indicates an action time value, wherein the action time value being equal to a reserved value indicates to use the default action time, wherein the action time value not being equal to the reserved value indicates to use the action time value as the non-default action time.

A method of wireless communication for a user equipment (UE), comprising receiving, by the UE, a downlink communication from a base station, the downlink communication comprising a downlink control information (DCI) or a medium access control (MAC) control element (CE) or a radio resource control (RRC) signaling configured to update at least one semi-persistent scheduling (SPS) or configured grant (CG) parameter for a group of UEs including the UE; determining an action time for the update to take effect based on the downlink communication; and applying the update to the at least one SPS or CG parameter for communications of the UE beginning at and following the action time.

The above method of wireless communication for a user equipment (UE), wherein the action time is a default action time which is common to the group of UEs, wherein one or more SPS or CG parameters are updated in a synchronized manner across the group of UEs at the default action time.

A method of wireless communication for a user equipment (UE), comprising receiving, by the UE, a downlink communication from a base station, the downlink communication comprising a downlink control information (DCI) including an indicator indicating whether to send an acknowledgment/negative acknowledgement for the DCI; sending the acknowledgment/negative acknowledgement for the DCI in response to the indicator indicating to send the acknowledgment/negative acknowledgement; and skipping generation of and the sending of the acknowledgment/negative acknowledgement for the DCI in response to the indicator indicating to not send the acknowledgment/negative acknowledgement.

An apparatus for wireless communication, comprising a transceiver; a memory configured to store instructions; and one or more processors communicatively coupled with the transceiver and the memory, wherein the one or more processors are configured to execute the instructions to perform the operations of any of the above methods of wireless communication for a user equipment (UE).

An apparatus for wireless communication, comprising means for performing the operations of any of the above methods of wireless communication for a user equipment (UE).

A computer-readable medium, comprising code executable by one or more processors to perform the operations of any of the above methods of wireless communication for a user equipment (UE).

An example method for wireless communication for a base station, comprising transmitting, by the base station, a downlink communication to a user equipment (UE), the downlink communication including an update to at least one semi-persistent scheduling (SPS) or configured grant (CG) parameter, wherein the downlink communication indicates whether to use a first action time or a second action time for the update to take effect; and applying the update to the at least one SPS or CG parameter for communications of the UE beginning at and following an action time based on the downlink communication.

The above method for wireless communication for a base station, wherein the first action time is a default action time whose value is determined based on a rule.

Any of the above methods for wireless communication for a base station, wherein: the downlink communication comprises an activation/reactivation downlink control information (DCI) that does not require an acknowledgement message or a negative acknowledgement message, wherein the default action time is an amount of time after receiving the activation/reactivation DCI, or the downlink communication comprises an activation/reactivation downlink control information (DCI) that requires an acknowledgement message or a negative acknowledgement message, wherein the default action time is an amount of time after transmitting the acknowledgement message or the negative acknowledgement message in response to the activation/reactivation DCI, or the downlink communication comprises a medium access control (MAC) control element (CE) that requires an acknowledgement message or a negative acknowledgement message, wherein the default action time is an amount of time after transmitting the acknowledgement message or the negative acknowledgement message in response to the MAC CE.

Any of the above methods for wireless communication for a base station, wherein the second action time is a non-default action time whose value is dynamically indicated by the base station.

Any of the above methods for wireless communication for a base station, wherein the non-default action time is common to a group of UEs, wherein one or more SPS or CG parameters are updated in a synchronized manner across the group of UEs at the non-default action time.

Any of the above methods for wireless communication for a base station, wherein the downlink communication that updates the at least one SPS or CG parameter comprises an activation/reactivation downlink control information (DCI) or a medium access control (MAC) control element (CE), wherein the non-default action time is indicated in the activation/reactivation DCI or the MAC CE.

Any of the above methods for wireless communication for a base station, wherein: the non-default action time is a relative time offset with reference to the activation/reactivation DCI or the MAC CE, or the non-default action time is an absolute time.

Any of the above methods for wireless communication for a base station, wherein the absolute time is expressed in one of a frame index, a subframe index, a slot index, or a symbol index.

Any of the above methods for wireless communication for a base station, wherein the downlink communication that updates the at least one SPS or CG parameter comprises a downlink control information (DCI) or a medium access control (MAC) control element (CE) or a radio resource control (RRC) signaling, wherein the DCI or the MAC CE or the RRC signaling dynamically indicates whether to use the first action time or the second action time for the update to take effect.

Any of the above methods for wireless communication for a base station, wherein the first action time is a default action time and the second action time is a non-default action time, wherein the downlink communication that updates the at least one SPS or CG parameter comprises an activation/reactivation DCI that indicates an action time value, wherein the action time value being equal to a reserved value indicates to use the default action time, wherein the action time value not being equal to the reserved value indicates to use the action time value as the non-default action time.

A method of wireless communication for a base station, comprising transmitting, by the base station, a downlink communication to a group of UEs, the downlink communication comprising a downlink control information (DCI) or a medium access control (MAC) control element (CE) or a radio resource control (RRC) signaling configured to update at least one semi-persistent scheduling (SPS) or configured grant (CG) parameter for the group of UEs; and applying the update to the at least one SPS or CG parameter for communications of the group of UEs beginning at and following an action time.

The above method for wireless communication for a base station, wherein the action time is a default action time which is common to the group of UEs, wherein one or more SPS or CG parameters are updated in a synchronized manner across the group of UEs at the default action time.

A method of wireless communication for a base station, comprising transmitting, by the base station, a downlink communication to a user equipment (UE), the downlink communication comprising a downlink control information (DCI) including an indicator indicating whether to send an acknowledgment/negative acknowledgement for the DCI; receiving the acknowledgment/negative acknowledgement for the DCI in response to the indicator indicating to send the acknowledgment/negative acknowledgement; and skipping the receiving of the acknowledgment/negative acknowledgement for the DCI in response to the indicator indicating to not send the acknowledgment/negative acknowledgement.

A base station for wireless communication, comprising a transceiver; a memory configured to store instructions; and one or more processors communicatively coupled with the transceiver and the memory, wherein the one or more processors are configured to execute the instructions to perform the operations of any of the above methods for wireless communication for a base station.

An apparatus for wireless communication, comprising means for performing the operations of any of the above methods for wireless communication for a base station.

A computer-readable medium, comprising code executable by one or more processors to perform the operations of any of the above methods for wireless communication for a base station.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   receiving, by the UE, a downlink communication from a base station, the downlink communication including an update to at least one semi-persistent scheduling (SPS) or configured grant (CG) parameter, wherein the downlink communication indicates an action time value configured to indicate whether to use a default action time or a non-default action time as an action time for the update to take effect based on the downlink communication;
   determining to use the default action time as the action time responsive to the action time value being equal to a reserved value and to use the non-default action time as the action time responsive to the action time value being different than the reserved value; and
   applying the update to the at least one SPS or CG parameter for communications of the UE beginning at and following the action time.

2. The method of claim 1, wherein a value of the default action time is determined based on a rule.

3. The method of claim 2, wherein the downlink communication comprises an activation/reactivation downlink control information (DCI) that does not require an acknowledgement message or a negative acknowledgement message, wherein the default action time is an amount of time after receiving the activation/reactivation DCI.

4. The method of claim 2, wherein the downlink communication comprises an activation/reactivation downlink control information (DCI) that requires an acknowledgement message or a negative acknowledgement message, wherein the default action time is an amount of time after transmitting the acknowledgement message or the negative acknowledgement message in response to the activation/reactivation DCI.

5. The method of claim 2, wherein the downlink communication comprises a medium access control (MAC) control element (CE) that requires an acknowledgement message or a negative acknowledgement message, wherein the default action time is an amount of time after transmitting the acknowledgement message or the negative acknowledgement message in response to the MAC CE.

6. The method of claim 1, wherein a value of the non-default action time is dynamically indicated by the base station.

7. The method of claim 6, wherein the non-default action time is common to a group of UEs, wherein one or more SPS or CG parameters are updated in a synchronized manner across the group of UEs at the non-default action time.

8. The method of claim 6, wherein the downlink communication that updates the at least one SPS or CG parameter comprises an activation/reactivation downlink control information (DCI) or a medium access control (MAC) control element (CE), wherein the non-default action time is indicated in the activation/reactivation DCI or the MAC CE.

9. The method of claim 8, wherein the non-default action time is a relative time offset with reference to the activation/reactivation DCI or the MAC CE.

10. The method of claim 8, wherein the non-default action time is an absolute time.

11. The method of claim 10, wherein the absolute time is expressed in one of a frame index, a subframe index, a slot index, or a symbol index.

12. The method of claim 1, wherein the downlink communication that updates the at least one SPS or CG parameter comprises a downlink control information (DCI) or a medium access control (MAC) control element (CE) or a radio resource control (RRC) signaling, wherein the DCI or the MAC CE or the RRC signaling dynamically indicates whether to use the default action time or the non-default action time as the action time for the update to take effect.

13. The method of claim 12, wherein the downlink communication comprises an activation/reactivation DCI.

14. A user equipment (UE), comprising:
a transceiver;
a memory configured to store instructions; and
one or more processors communicatively coupled with the transceiver and the memory, wherein the one or more processors are configured to execute the instructions to perform wireless communication comprising:
receiving, by the UE, a downlink communication from a base station, the downlink communication including an update to at least one semi-persistent scheduling (SPS) or configured grant (CG) parameter, wherein the downlink communication indicates an action time value configured to indicate whether to use a default action time or a non-default action time as an action time for the update to take effect based on the downlink communication;
determining to use the default action time as the action time responsive to the action time value being equal to a reserved value and to use the non-default action time as the action time responsive to the action time value being different than the reserved value; and
applying the update to the at least one SPS or CG parameter for communications of the UE beginning at and following the action time.

15. An apparatus for wireless communication, comprising:
means for receiving, by a user equipment (UE), a downlink communication from a base station, the downlink communication including an update to at least one semi-persistent scheduling (SPS) or configured grant (CG) parameter, wherein the downlink communication indicates an action time value configured to indicate whether to use a default action time or a non-default action time as an action time for the update to take effect based on the downlink communication;
means for determining to use the default action time as the action time responsive to the action time value being equal to a reserved value and to use the non-default action time as the action time responsive to the action time value being different than the reserved value; and
means for applying the update to the at least one SPS or CG parameter for communications of the UE beginning at and following the action time.

16. A non-transitory computer-readable medium comprising code executable by one or more processors to perform wireless communication comprising:
receiving, by a user equipment (UE), a downlink communication from a base station, the downlink communication including an update to at least one semi-persistent scheduling (SPS) or configured grant (CG) parameter, wherein the downlink communication indicates an action time value configured to indicate whether to use a default action time or a non-default action time as an action time for the update to take effect based on the downlink communication;
determining to use the default action time as the action time responsive to the action time value being equal to a reserved value and to use the non-default action time as the action time responsive to the action time value being different than the reserved value; and
applying the update to the at least one SPS or CG parameter for communications of the UE beginning at and following the action time.

17. A method of wireless communication for a base station, comprising:
transmitting, by the base station, a downlink communication to a user equipment (UE), the downlink communication including an update to at least one semi-persistent scheduling (SPS) or configured grant (CG) parameter, wherein the downlink communication indicates an action time value configured to indicate whether to use a default action time or a non-default action time as an action time for the update to take effect, wherein the action time value being equal to a reserved value indicates to use the default action time as the action time, wherein the action time value being different than the reserved value indicates to use the non-default action time as the action time; and
applying the at least one SPS or CG parameter update for communications with the UE beginning at and following an action time based on the downlink communication.

18. The method of claim 17, wherein a value of the default action time is determined based on a rule.

19. The method of claim 18, wherein the downlink communication comprises an activation/reactivation downlink control information (DCI) that does not require an acknowledgement message or a negative acknowledgement message, wherein the default action time is an amount of time after receiving the activation/reactivation DCI.

20. The method of claim 18, wherein the downlink communication comprises an activation/reactivation downlink control information (DCI) that requires an acknowledgement message or a negative acknowledgement message, wherein the default action time is an amount of time after transmitting the acknowledgement message or the negative acknowledgement message in response to the activation/reactivation DCI.

21. The method of claim 18, wherein the downlink communication comprises a medium access control (MAC) control element (CE) that requires an acknowledgement message or a negative acknowledgement message, wherein the default action time is an amount of time after transmitting the acknowledgement message or the negative acknowledgement message in response to the MAC CE.

22. The method of claim 17, wherein a value of the non-default action time is dynamically indicated by the base station.

23. The method of claim 22, wherein the non-default action time is common to a group of UEs, wherein one or more SPS or CG parameters are updated in a synchronized manner across the group of UEs at the non-default action time.

24. The method of claim 22, wherein the downlink communication that updates the at least one SPS or CG parameter comprises an activation/reactivation downlink control information (DCI) or a medium access control (MAC) control element (CE), wherein the non-default action time is indicated in the activation/reactivation DCI or the MAC CE.

25. The method of claim 24, wherein the non-default action time is a relative time offset with reference to the activation/reactivation DCI or the MAC CE.

26. The method of claim 24, wherein the non-default action time is an absolute time.

27. The method of claim 26, wherein the absolute time is expressed in one of a frame index, a subframe index, a slot index, or a symbol index.

28. The method of claim 17, wherein the downlink communication that updates the at least one SPS or CG parameter comprises a downlink control information (DCI) or a medium access control (MAC) control element (CE) or a radio resource control (RRC) signaling, wherein the DCI or the MAC CE or the RRC signaling dynamically indicates whether to use the default action time or the non-default action time as the action time for the update to take effect.

29. The method of claim 28, wherein the downlink communication comprises an activation/reactivation DCI.

30. A base station, comprising:
a transceiver;
a memory configured to store instructions; and
one or more processors communicatively coupled with the transceiver and the memory, wherein the one or more processors are configured to execute the instructions to perform wireless communication comprising:
transmitting, by the base station, a downlink communication to a user equipment (UE), the downlink communication including an update to at least one semi-persistent scheduling (SPS) or configured grant (CG) parameter, wherein the downlink communication indicates an action time value configured to indicate whether to use a default action time or a non-default action time as an action time for the update to take effect, wherein the action time value being equal to a reserved value indicates to use the default action time as the action time, wherein the action time value being different than the reserved value indicates to use the non-default action time as the action time; and
applying the at least one SPS or CG parameter update for communications with the UE beginning at and following the action time.

31. An apparatus for wireless communication, comprising:
means for transmitting, by a base station, a downlink communication to a user equipment (UE), the downlink communication including an update to at least one semi-persistent scheduling (SPS) or configured grant (CG) parameter, wherein the downlink communication indicates an action time value configured to indicate whether to use a default action time or a non-default action time as an action time for the update to take effect, wherein the action time value being equal to a reserved value indicates to use the default action time as the action time, wherein the action time value being different than the reserved value indicates to use the non-default action time as the action time; and
means for applying the at least one SPS or CG parameter update for communications with the UE beginning at and following the action time.

32. A non-transitory computer-readable medium comprising code executable by one or more processors to perform wireless communication comprising:
transmitting, by a base station, a downlink communication to a user equipment (UE), the downlink communication including an update to at least one semi-persistent scheduling (SPS) or configured grant (CG) parameter, wherein the downlink communication indicates an action time value configured to indicate whether to use a default action time or a non-default action time as an action time for the update to take effect, wherein the action time value being equal to a reserved value indicates to use the default action time as the action time, wherein the action time value being different than the reserved value indicates to use the non-default action time as the action time; and
applying the at least one SPS or CG parameter update for communications with the UE beginning at and following the action time.

* * * * *